United States Patent
Nichols

(10) Patent No.: US 11,745,549 B2
(45) Date of Patent: Sep. 5, 2023

(54) PRESSURE SENSING ASSEMBLY FOR A BICYCLE WHEEL

(71) Applicant: SRAM, LLC, Chicago, IL (US)

(72) Inventor: Geoff Nichols, San Luis Obispo, CA (US)

(73) Assignee: SRAM. LLC, Chicago, IL (US)

( * ) Notice: Subject to any disclaimer, the term of this patent is extended or adjusted under 35 U.S.C. 154(b) by 590 days.

(21) Appl. No.: 15/681,846

(22) Filed: Aug. 21, 2017

(65) Prior Publication Data

US 2019/0054780 A1 Feb. 21, 2019

(51) Int. Cl.
*B60C 23/04* (2006.01)
*G01L 17/00* (2006.01)
*B60C 23/00* (2006.01)

(52) U.S. Cl.
CPC ........ *B60C 23/0408* (2013.01); *B60C 23/006* (2013.01); *B60C 23/0406* (2013.01); *B60C 23/0488* (2013.01); *B60C 23/0494* (2013.01); *B60C 23/0498* (2013.01); *G01L 17/00* (2013.01)

(58) Field of Classification Search
None
See application file for complete search history.

(56) References Cited

U.S. PATENT DOCUMENTS

| | | | | |
|---|---|---|---|---|
| 3,111,644 A | * | 11/1963 | Froelich | B60C 23/0433 340/447 |
| 4,048,614 A | * | 9/1977 | Shumway | B60C 23/0408 340/447 |
| 4,320,864 A | | 3/1982 | Novak et al. | |
| 4,350,854 A | * | 9/1982 | Matsuda | B60C 23/0428 200/61.25 |
| 4,435,625 A | * | 3/1984 | Buchschmid | B60C 23/0408 200/61.22 |
| 5,040,561 A | * | 8/1991 | Achterholt | B60C 23/0408 116/34 R |
| 5,774,048 A | * | 6/1998 | Achterholt | B60C 23/0408 340/442 |
| 5,853,020 A | | 12/1998 | Widner | |
| 6,199,575 B1 | | 3/2001 | Widner | |

(Continued)

FOREIGN PATENT DOCUMENTS

| CN | 100449288 C | 1/2009 |
|---|---|---|
| CN | 105150776 A | 12/2015 |

(Continued)

OTHER PUBLICATIONS

Gigazine, "BTPS system which real-time understand the pressure of the tire of the bicycle via iPhone etc", Jan. 10, 2013, 7 pages.

*Primary Examiner* — Jill E Culler

(57) ABSTRACT

A pressure sensing assembly configured to be attached to a bicycle wheel having a tire and a rim mounted to the tire. The pressure sensing assembly includes a housing, a pressure transmitting member, a sensing chamber defined by the housing and the pressure transmitting member, and a sensing element. The pressure transmitting member is coupled the housing and has a central portion offset from the plane in a first direction. The sensing element is offset from the plane in a second direction opposite the first direction. The pressure transmitting member is configured to transmit a pressure in the tire to the sensing element via the sensing chamber.

16 Claims, 22 Drawing Sheets

(56) References Cited

U.S. PATENT DOCUMENTS

| | | | |
|---|---|---|---|
| 6,568,259 B2 * | 5/2003 | Saheki | B60C 23/0408 73/146 |
| 6,799,455 B1 * | 10/2004 | Neefeldt | B60C 23/0496 73/146 |
| 6,959,597 B2 * | 11/2005 | Ito | B60C 23/0408 73/146.4 |
| 7,021,147 B1 | 4/2006 | Subramanian | |
| 7,196,616 B2 * | 3/2007 | Huang | B60C 23/0496 116/34 B |
| 7,667,583 B2 | 2/2010 | Petrucelli | |
| 8,291,755 B2 * | 10/2012 | Fukui | B60C 23/006 73/146 |
| 8,373,551 B2 | 2/2013 | Laird et al. | |
| 8,984,937 B1 | 3/2015 | Falkenborg | |
| 9,927,314 B2 * | 3/2018 | Dammen | G01L 9/008 |
| 2002/0059825 A1 | 5/2002 | Lundqvist | |
| 2002/0126006 A1 | 9/2002 | Yamagiwa et al. | |
| 2003/0112137 A1 | 6/2003 | Saheki | |
| 2004/0031316 A1 | 2/2004 | Lundqvist | |
| 2004/0055641 A1 | 3/2004 | Ostrowiecki | |
| 2005/0040941 A1 | 2/2005 | Schofield | |
| 2006/0191466 A1 | 8/2006 | Huang | |
| 2007/0234814 A1 | 10/2007 | Silverbrook et al. | |
| 2010/0095756 A1 | 4/2010 | Fukui et al. | |
| 2012/0176233 A1 | 7/2012 | Petrucelli et al. | |
| 2013/0112510 A1 | 5/2013 | Jordan et al. | |
| 2013/0312509 A1 | 11/2013 | Solomon et al. | |
| 2015/0110645 A1 | 4/2015 | Wu | |
| 2015/0231936 A1 | 8/2015 | Keller et al. | |
| 2017/0368894 A1 | 12/2017 | Kordes et al. | |

FOREIGN PATENT DOCUMENTS

| | | |
|---|---|---|
| CN | 106715163 A | 5/2017 |
| DE | 202013102794 | 9/2014 |
| DE | 202014105743 U1 | 12/2014 |
| DE | 102014220945 | 4/2015 |
| DE | 102014110184 A1 | 1/2016 |
| EP | 3254873 | 12/2017 |
| GB | 201104095 | 4/2011 |
| GB | 2490302 A | 10/2012 |
| JP | H1044726 A | 2/1998 |
| JP | 2004066849 | 3/2004 |
| JP | 2005231519 A | 9/2005 |
| JP | 2007038993 | 2/2007 |
| JP | 200858284 A | 3/2008 |
| KR | 1020100109735 A | 10/2010 |
| KR | 20160088083 | 7/2016 |
| TW | 200426048 A | 12/2004 |
| WO | 1996036861 | 11/1996 |
| WO | 2002020287 A1 | 3/2002 |
| WO | 2011053809 | 5/2011 |
| WO | 2013013325 A1 | 1/2013 |
| WO | 2016072831 A1 | 5/2016 |
| WO | 2017/087673 A1 | 5/2017 |

\* cited by examiner

PRESSURE SENSING ASSEMBLY FOR A BICYCLE WHEEL

FIELD OF THE DISCLOSURE

The present disclosure generally relates to bicycles, and, more particularly, to a pressure sensing assembly that quickly and easily detects and indicates a pressure in the bicycle wheel.

BACKGROUND

Bicycle wheels are known to include a rim and a pneumatic tire mounted to the rim. When in use, pneumatic tires help to generate the forces necessary for bicycle propulsion, braking, balancing, and turning, and serve as an important source of suspension for the bicycle.

Thus, it is good practice to verify that the pneumatic tires are properly pressurized prior to riding the bicycle. Conventionally, this is done by attaching a pump to the bicycle wheel (e.g., via a Presta or Schrader valve) and using a gauge on the pump to check the pressure. While an effective means to check pressure, the pump lets air out of the pneumatic tire in the process, such that users of the bicycle typically must pump up the tire before each ride.

SUMMARY

In accordance with a first exemplary aspect of the present invention, a pressure sensing assembly is provided. The pressure sensing assembly is configured to be attached to a bicycle wheel having a tire and a rim mounted to the tire, and includes a housing, a pressure transmitting member coupled to the housing, a sensing chamber, and a sensing element. The housing defines a plane. The pressure transmitting member has a central portion offset from the plane in a first direction. The sensing chamber is defined by the housing and the pressure transmitting wall. The sensing element is offset from the plane in a second direction opposite the first direction. The pressure transmitting member is configured to transmit a pressure in the tire to the sensing element via the sensing chamber.

In accordance with a second exemplary aspect of the present invention, a bicycle wheel is provided. The bicycle wheel includes a rim, a tire mounted to a tire bed of the rim, and a pressure sensing assembly attachable to the rim. The pressure sensing assembly includes a housing and a sensing element. The housing has a surface that is configured to engage the tire bed. The tire bed has a tire engagement surface configured to accept the housing. The sensing element is arranged to measure a pressure in the tire.

In further accordance with any one or more of the foregoing first and second exemplary aspects, a pressure sensing assembly or a bicycle wheel may include any one or more of the following further preferred forms.

In one preferred form, wherein the pressure transmitting member includes a deflecting member, which may have a convex outer surface.

In another preferred form, the pressure transmitting member is movable responsive to pressure changes in the tire.

In another preferred form, the sensing element is arranged in the sensing chamber.

In another preferred form, a printed circuit board is disposed within the sensing chamber and a power source is coupled to the printed circuit board, and the sensing element is disposed on the printed circuit board.

In another preferred form, a printed circuit board is disposed within the sensing chamber, and a first wireless communicator is coupled to the printed circuit board and configured to transmit data indicative of the sensed pressure of the tire.

In another preferred form, a printed circuit board is disposed within the sensing chamber and a power source is coupled to the printed circuit board, and the sensing element is disposed on the printed circuit board.

In another preferred form, a second chamber is arranged adjacent the sensing chamber, the second chamber fluidly isolated from the sensing chamber, and the sensing element is arranged in the second chamber.

In another preferred form, a printed circuit board is disposed within the second chamber, and a first wireless communicator is coupled to the printed circuit board and configured to transmit data indicative of the sensed pressure of the tire.

In another preferred form, a printed circuit board is provided and a light-emitting element is coupled to the printed circuit board, the light-emitting element configured to emit light indicative of the sensed pressure of the tire.

In another preferred form, incompressible fluid is disposed in the sensing chamber.

In another preferred form, a reference port is formed in the housing and is fluid communication with atmosphere, and a gas permeable and fluid impermeable barrier is arranged between the sensing element and the reference port.

In another preferred form, a pressure transmitting member (e.g., a wall) is coupled to the housing, a sensing chamber is defined by the housing and the pressure transmitting member, and the pressure transmitting member is configured to transmit the pressure in the tire to the sensing element via the sensing chamber.

In another preferred form, the sensing chamber is fluidly isolated from an interior of the tire.

In another preferred form, the tire is tubeless.

In another preferred form, the pressure transmitting wall has a curved outer surface, and the pressure transmitting wall is movable responsive to pressure changes in the tire.

In another preferred form, a light pipe is coupled to the light-emitting element and a lens is coupled to the light pipe, and the lens extends through an opening formed in the tire bed of the rim, such that light emitted by the light-emitting element is visible In another preferred form, the sensor assembly is operable in different modes responsive to user activity associated with the tire.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is generally directed to examples of pressure sensing assemblies that solve or improve upon one or more of the above-noted and/or other problems and disadvantages with prior known devices for checking the pressure of a bicycle wheel. The pressure sensor assemblies disclosed herein allow a user of the bicycle to quickly and easily determine the pressure of the wheels of the bicycle without having to utilize conventional the pump and gauge systems described above. Thus, the user of the bicycle can, for example, determine the pressure of the wheels without affecting the pressure therein.

Figure 1:
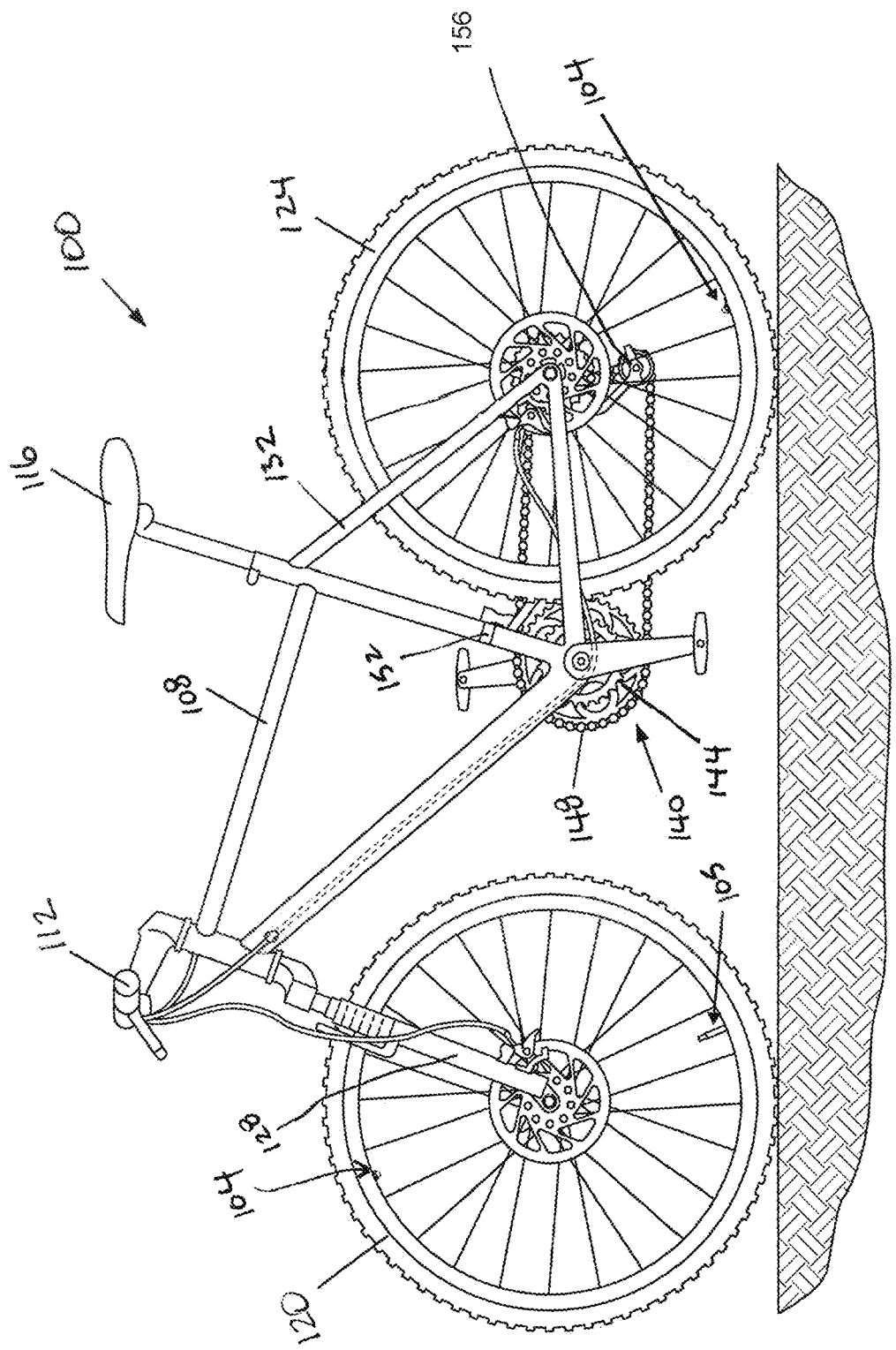
FIG. 1 is a side view of a bicycle that employs a pressure sensor assembly constructed in accordance with the teachings of the present disclosure.

FIG. 1 generally illustrates a bicycle 100 that employs a pressure sensing assembly 104 constructed in accordance with the teachings of the present disclosure. The bicycle 100, which in this example takes the form of a mountain bicycle, has a frame 108, handlebars 112 near a front end of the frame 108, and a seat or saddle 116 for supporting a user (e.g., a rider) of the bicycle 100 on the frame 108. The bicycle 100 also includes a first or front wheel 120 and a second or rear wheel 124. The front wheel 120 is carried by a front fork 128 of the frame 108 and supports the front end of the frame 108, while the rear wheel 124 is carried by a rear fork 132 of the frame 108 and supports a rear end of the frame 108. In an embodiment, the rear end of the frame 108 may be supported by a rear suspension component (not shown). The bicycle 100 also has a drive train 140 with a crank assembly 144 that is operatively coupled via a chain 148 to a rear cassette near a rotation axis of the rear wheel 124. It will also be appreciated that the bicycle 100 may include additional components, e.g., a front derailleur 152, a rear derailleur 156, a bicycle computer, a headset, and the like.

While the bicycle 100 illustrated in FIG. 1 is a mountain bicycle, the pressure sensing assembly 104, including the specific embodiments disclosed herein as well as alternative embodiments, may be implemented on other types of bicycles. As an example, the pressure sensing assembly 104 may be used in connection with road bicycles as well as bicycles with mechanical (e.g., cable, hydraulic, pneumatic, etc.) and non-mechanical (e.g., wired, wireless) drive systems.

Figure 2:
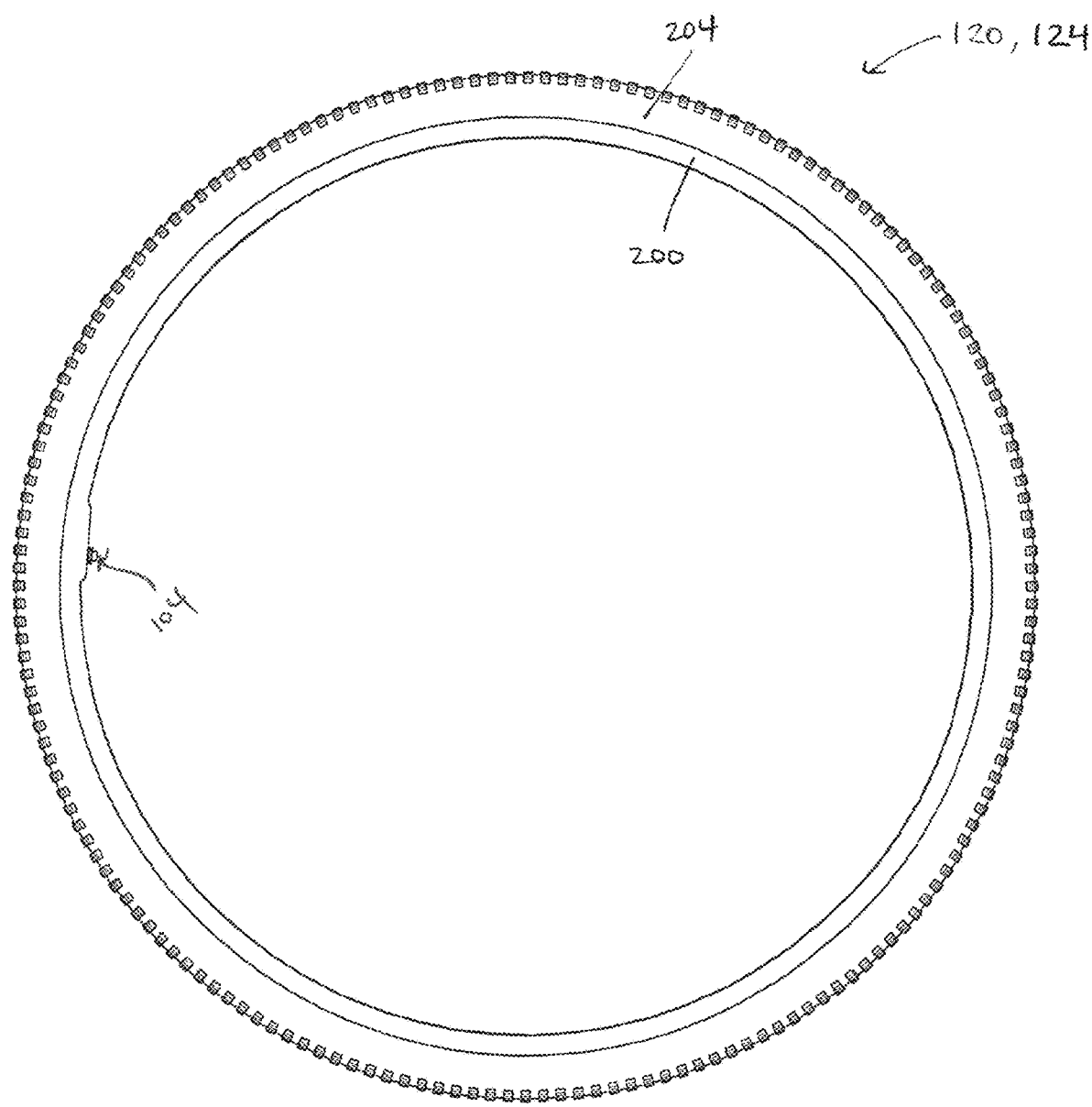
FIG. 2 is a side view of a bicycle wheel of the bicycle of FIG. 1.
Figure 3:
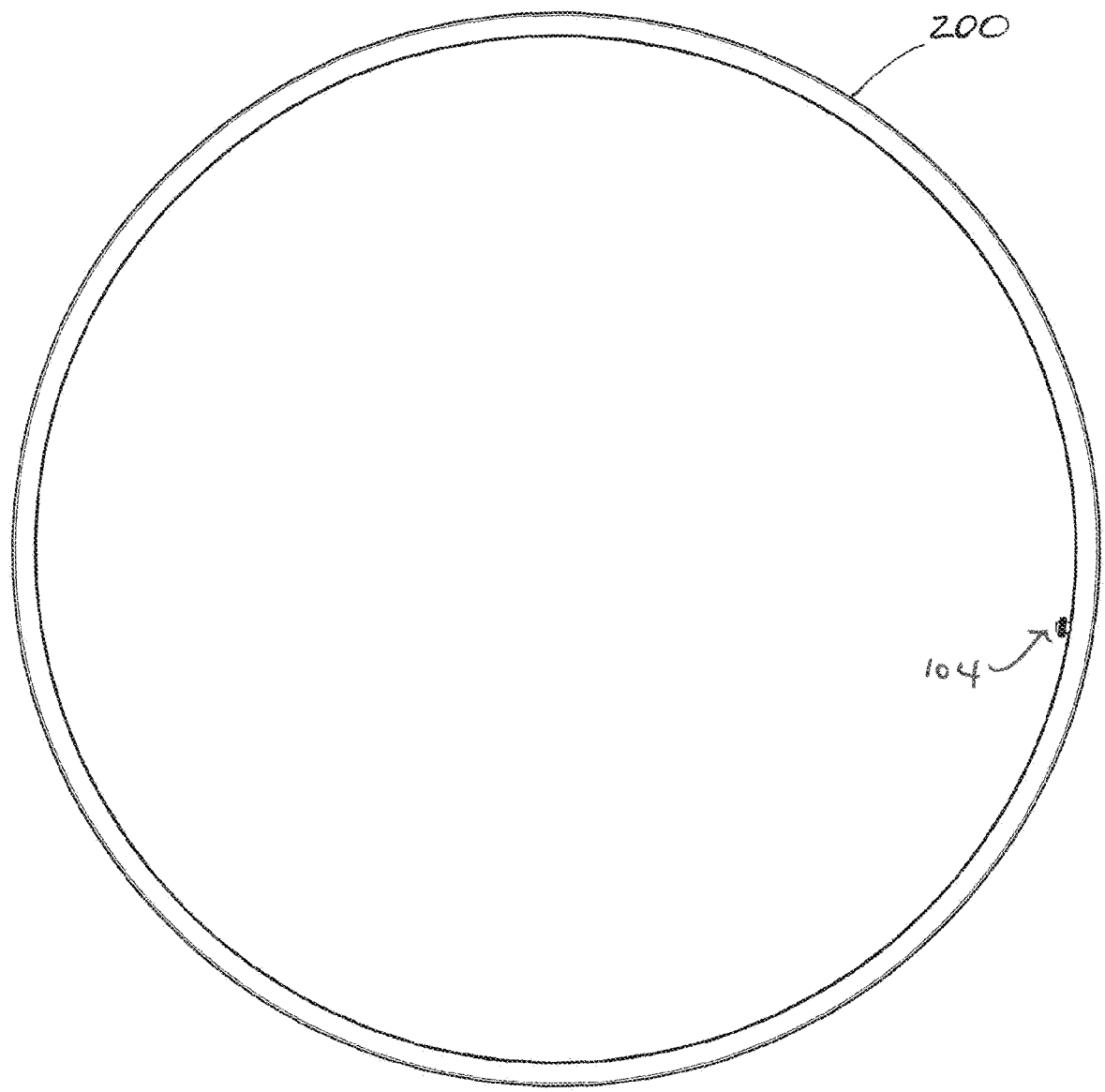
FIG. 3 is similar to FIG. 2, but with a tire of the bicycle wheel removed.
Figure 4:
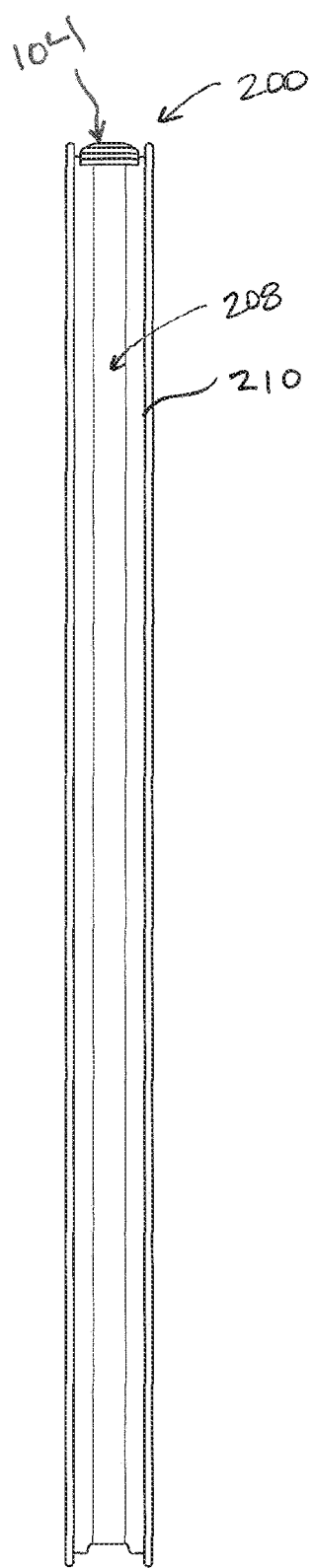
FIG. 4 is a top view of FIG. 3.

As will be appreciated from FIGS. 2-4, the rear wheel 124 of the bicycle 100, which is, in this example, similar to the front wheel 120, includes a rim 200 and a pneumatic tire 204 removably mounted to the rim 200. More particularly, a portion of the pneumatic tire 204 is disposed within a tire bed 208 of the rim 200 and engages a tire engagement surface 210 of the tire bed 208 (see FIG. 4), such that the pneumatic tire 204 is securely mounted to the rim 200. As will be discussed in greater detail below, the pneumatic tire 204 may be a tubed tire (i.e., one that includes an inner tube), a tubeless tire (i.e., one that does not include an inner tube), or some other type of tire. The pressure sensing assembly 104 may be attached to the rim 200 and operatively coupled to the pneumatic tire 204 such that the pressure sensing assembly 104 is able to detect or sense a pressure of a pneumatic chamber in the pneumatic tire 204, which may, for example, be defined by a tube disposed in an interior of the pneumatic tire 204, by the interior of the pneumatic tire 204 and a seal of the pneumatic tire 204, and/or one or more other components. The pressure sensing assembly 104 is, in turn, able to indicate or transmit the detected or sensed pressure to the user of the bicycle 100. Thus, the user of the bicycle 100 can easily and quickly check the pressure in the front and rear wheels 120, 124 without having to resort to using the conventional pump and gauge system described above.

In an embodiment, the pressure sensing assembly 104 is disposed on a radially opposing side of the rim than a valve stem 105 operative to allow the addition and/or removal of air from the pneumatic tire 204, for example as shown with respect to the front wheel 120 in FIG. 1. In this configuration the mass of the pressure sensing assembly 104 may be used to balance and/or offset the mass of the valve stem 105. In an embodiment, the rim may include at least a first hole and a second hole to facilitate the installation of both the valve stem 105 and the pressure sensing assembly 104, respectively. The first hole and the second hole may be disposed on radially opposing sides of the wheel.

Figure 5:
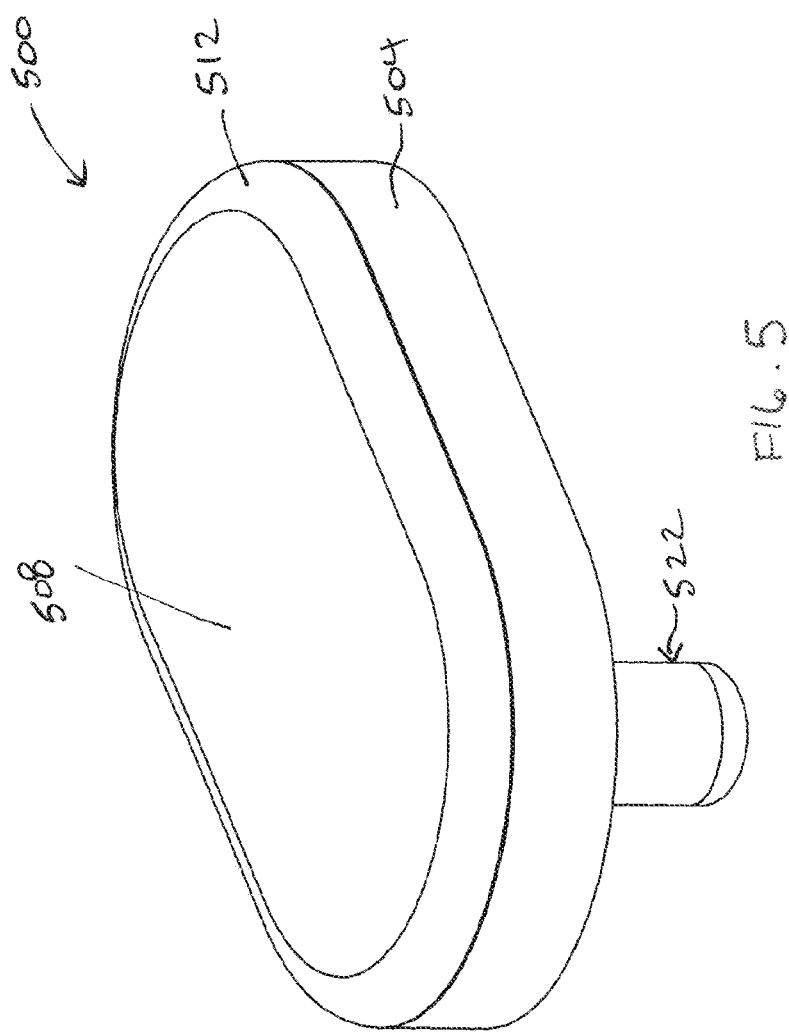
FIG. 5 is a perspective view of a first example of the pressure sensor assembly employed in the bicycle of FIG. 1.
Figure 6:
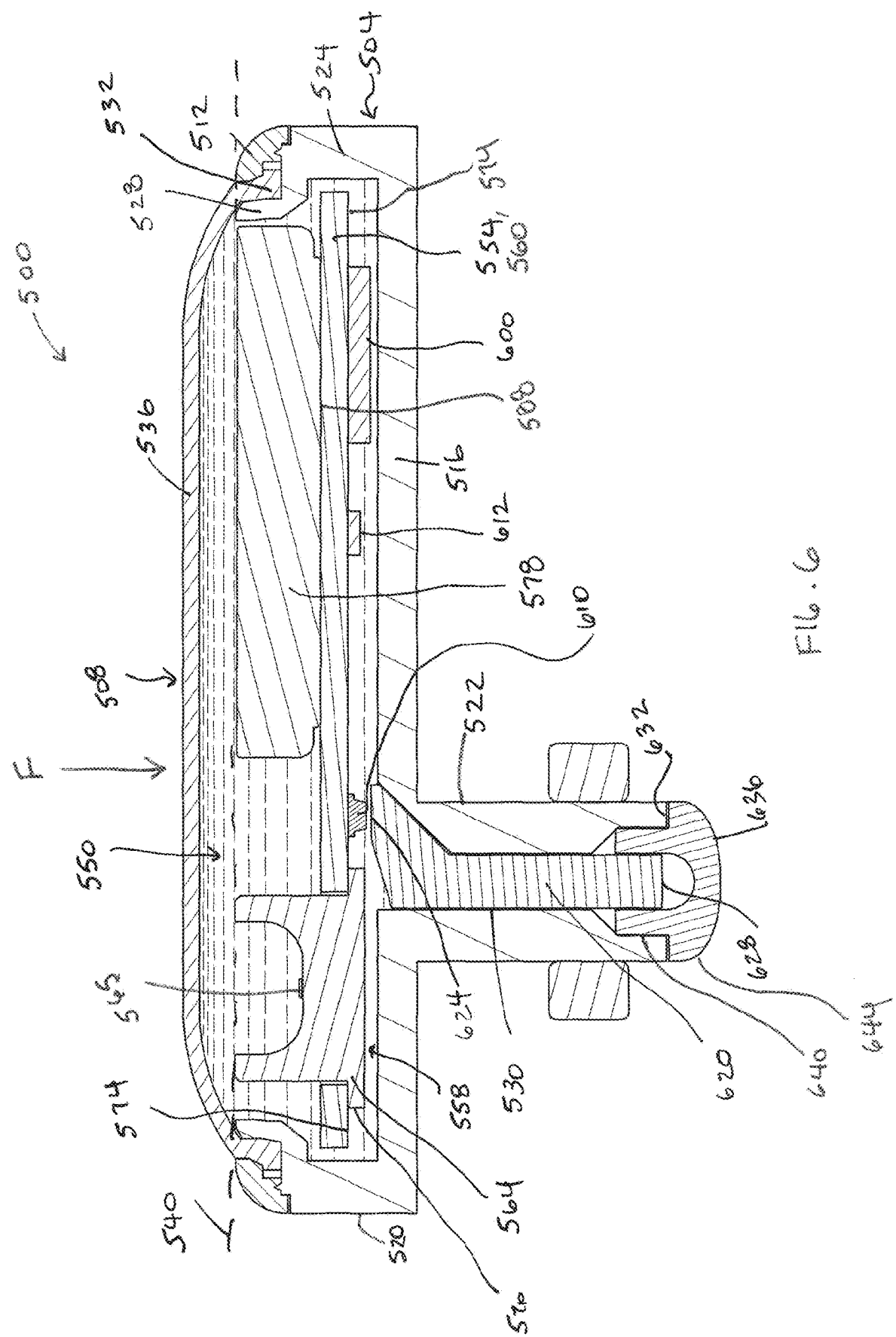
FIG. 6 is a cross-sectional view of the pressure sensor assembly of FIG. 5.
Figure 7:
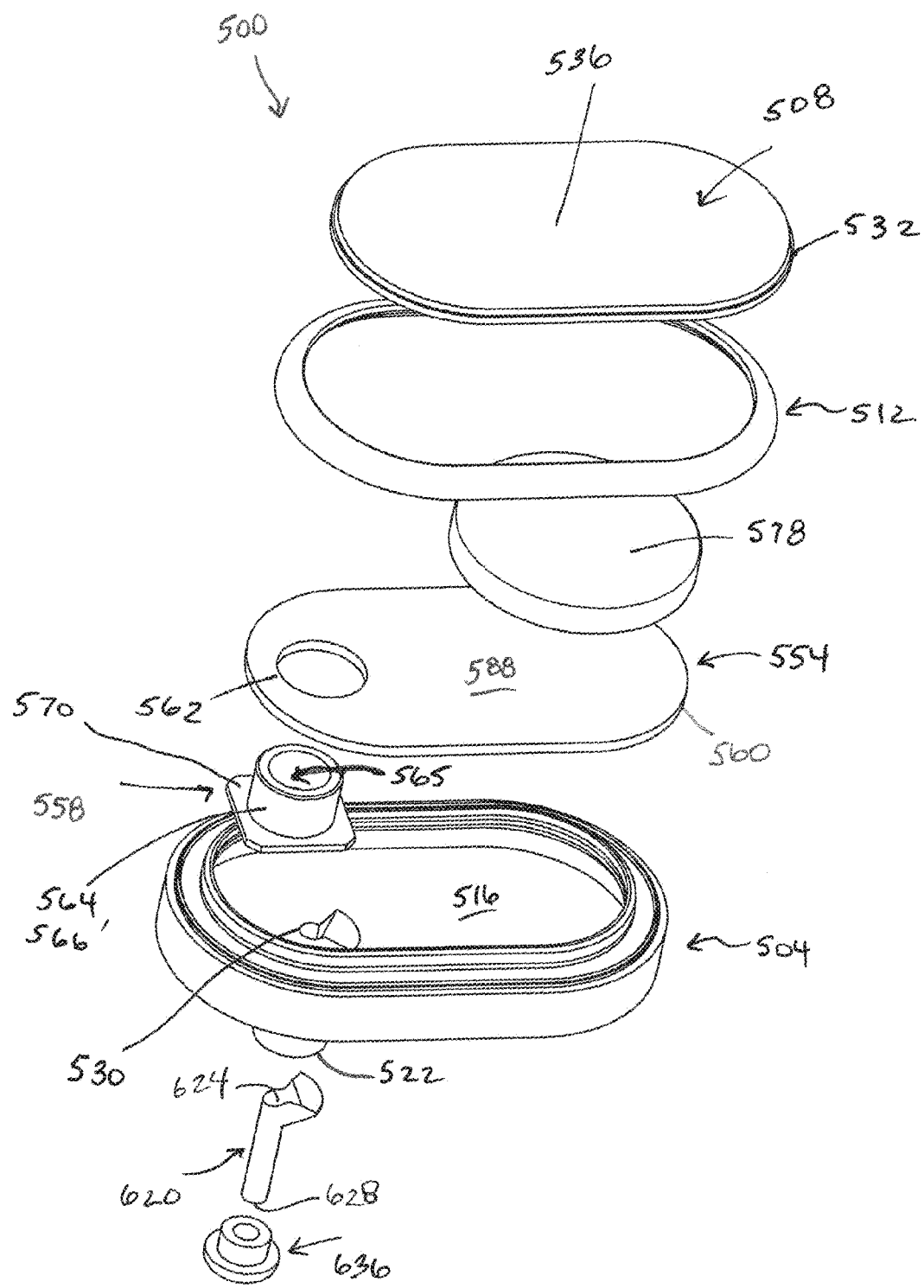
FIG. 7 is an exploded view of the pressure sensor assembly of FIG. 5.

FIGS. 5-7 illustrate a first example of the pressure sensing assembly 104, in the form of pressure sensing assembly 500, that may be removably attached to the rim 200, particularly the tire bed 208 of the rim 200, and operatively coupled to the pneumatic tire 204. The pressure sensing assembly 500 in this example includes a housing 504 and a pressure transmitting member 508 that is coupled to the housing 504 via a frame element 512. The housing 504 is preferably made of a substantially rigid material such as nylon, polycarbonate/abs alloy (PC/ABS), or any other suitable material. The housing 504 has a substantially annular shape defined by a base 516, a first wall portion 520 that extends upward from the base 516, and a second wall portion 522 that extends downward from the base 516. The first wall portion 520 has a first, substantially annular, portion 524 and a second portion 528 that extends radially inwardly from the first portion 524 before extending further upward relative to the base 516. The second wall portion 522 has an outer diameter that is smaller than an outer diameter of each of the base 516 and the first wall portion 520. As best illustrated in FIGS. 6 and 7, an opening 530 is formed or defined in the base 516 and extends through the second wall portion 522. The opening 530 is sized and shaped to receive a light transmitting element, e.g., a light pipe, of the pressure sensor assembly 500, which will be discussed in greater detail below.

The pressure transmitting member 508 illustrated in FIGS. 5-7 preferably takes the form of a wall that is made of a compliant material such as a vulcanized thermoplastic elastomer, silicone rubber, ethylene propylene diene monomer (EPDM) rubber, or the like, that substantially does not resist motion or a force applied thereto. The pressure transmitting member 508 may thus be referred to herein as a deflecting member or a compliant member, or, more specifically, a pressure transmitting wall. In this example, the pressure transmitting member 508 moves or deflects responsive to a force or a pressure applied thereto. In other examples, however, the pressure transmitting member 508 may not move or deflect, but will instead just not resist the force or pressure. But in all of these examples, the pressure transmitting member 508 is configured to transmit the pressure of the pneumatic chamber in the pneumatic tire 204 to other components of the pressure sensing assembly 500.

The pressure transmitting member 508 has a perimeter edge 532 that is secured between the second portion 528 of the perimeter wall 520 and the frame element 512 such that the pressure transmitting member 508 is secured in place. The pressure transmitting member 508 also has a central portion 536 that is radially inward of the perimeter edge 532 and protrudes outward from the perimeter edge 532, such that when the pressure transmitting member 508 is coupled to the housing 504, the central portion 536 of the pressure transmitting member 508 is exterior of, or spaced from, a plane 540 defined by the housing 504. In this example, the pressure transmitting member 508 protrudes outward, i.e., it has a convex shape, though in other examples, the pressure transmitting member 508 may instead have a concave shape or some other shape.

With reference to FIG. 6, the pressure sensing assembly 500 also includes a sensing chamber 550. The sensing chamber 550 is a sealed chamber defined by the housing 504 and the pressure transmitting member 508. When the pressure sensing assembly 500 is attached to the tire bed 208 of the rim, the sensing chamber 550 of the pressure sensing assembly is arranged or positioned to detect or sense a pressure of the pneumatic tire 204 via the pressure transmitting member 508. More particularly, the pressure transmitting member 508 is in pressure communication with the pneumatic chamber in the pneumatic tire 204, such that the pneumatic chamber in the pneumatic tire 204 applies a force F on the pressure transmitting member 508 based on the pressure of the pneumatic chamber in the pneumatic tire 204. The pressure transmitting member 508 is thus, at least in this example, movable or deflectable, relative to the housing 504, responsive to the pressure of the pneumatic chamber (e.g., responsive to pressure changes).

Because the sensing chamber 550 is partially defined by the pressure transmitting member 508, the sensing chamber 550 in turn has a pressure that tracks or corresponds to the pressure of the pneumatic chamber in the pneumatic tire 204. Thus, when, for example, the pressure of the pneumatic chamber in the pneumatic tire 204 is low, the pressure transmitting member 508 will protrude further outward, relative to the plane 540 of the housing 504, than it would when the pressure of the pneumatic chamber in the pneumatic tire 204 is high (as the force applied to the pressure transmitting member 508 is lower), such that the volume of the sensing chamber 550 is greater (and the pressure therein lower) when the pressure of the pneumatic chamber in the pneumatic tire 204 is lower as compared to when the pressure of the pneumatic chamber in the pneumatic tire 204 is high(er).

The pressure sensing assembly 500 further includes a printed circuit board assembly (PCBA) 554 and a pressure sensing mechanism 558 physically and communicatively connected to the PCB 554. As illustrated, the PCBA 554 is seated against the base 516 of the housing 504 such that the PCBA 554 is disposed in the sensing chamber 550. The PCBA 554 in this example includes a substrate 560 and a printed circuit board (PCB) 561, i.e., circuitry, coupled (e.g., attached, applied) to the substrate 560. The substrate 560 generally forms the structure and/or shape of the PCBA 554. In this example, the substrate 560 has an annular shape and includes a circular aperture 562 sized and arranged to receive the pressure sensing mechanism 558. In other examples, however, the shape and/or size of the substrate 560 may vary. The substrate 560 may be any substance operable to form the underlying attachment for the PCB 561. For example, silicon, silicon dioxide, aluminum oxide, sapphire, germanium, gallium arsenide ("GaAs"), an alloy of silicon and germanium, or indium phosphide ("InP"), may be used. The substrate 560 may be rigid or flexible. The substrate 560 may be one continuous piece of substrate material, or multiple pieces. In this example, the PCB 561 includes or is formed of a number of electronic components such as, for example, a microcontroller 600, a first wireless communication device 604, a second wireless communication device 608, a light-emitting element 610, and a sensor 612, coupled to the substrate 560. In other examples, the PCB 561 may include additional, fewer, or different components. As an example, the PCB 561 may only include one wireless communication device.

The pressure sensing mechanism 558 in this example takes the form of a sensor housing 564 and a pressure sensing element (e.g., a sensor) 565 arranged in the sensor housing 564. The pressure sensing element 558 may, for example, be manufactured TE Connectivity. The sensor housing 564 has a cylindrical portion 566 that extends through the circular aperture 562, and a flanged portion 570 that is seated against a bottom surface 574 of the substrate 560 to couple the pressure sensing mechanism 558 to the substrate 560 of the PCBA 554.

As such, a portion of the pressure sensing mechanism 558 lies in the plane 540 defined by the housing 504, while the remainder of the pressure sensing mechanism 558 (e.g., the flanged portion 570) is spaced from the plane 540 in a direction opposite the central portion 536 of the pressure transmitting member 508. In other words, the central portion 536 of the pressure transmitting member 508 and a substantial portion of the pressure sensing mechanism 558 are on opposite sides of the plane 540. Thus, the pressure sensing mechanism 558 is positioned in the sensing chamber 550, such that the pressure sensing mechanism 558 can detect or sense the pressure in the sensing chamber 550, which, as discussed above, tracks or corresponds to the pressure of the pneumatic chamber in the pneumatic tire 204. At the same time, because the sensing chamber 550 is sealed, the pressure sensing mechanism 558 is fluidly isolated from any sealant that might be in the pneumatic chamber (e.g., when the pneumatic chamber does not include an inner tube), which may otherwise serve to plug the pressure sensing mechanism 558.

Further yet, the pressure sensing assembly 500 includes a power source 578. The power source 578 is generally configured to supply power to the various components of the assembly 500. In this example, the power source 578 is a battery that is seated against a top surface 588 of the PCB 554, opposite the bottom surface 574. The battery may be a specially fitted or configured battery, or may be a standard battery such as a CR 2016, CR 2012, CR 2016, or CR 2032 battery. In other examples, the power source 578 may be positioned elsewhere and/or may instead take the form of a combination of multiple batteries and/or other power providing devices.

Figure 8:
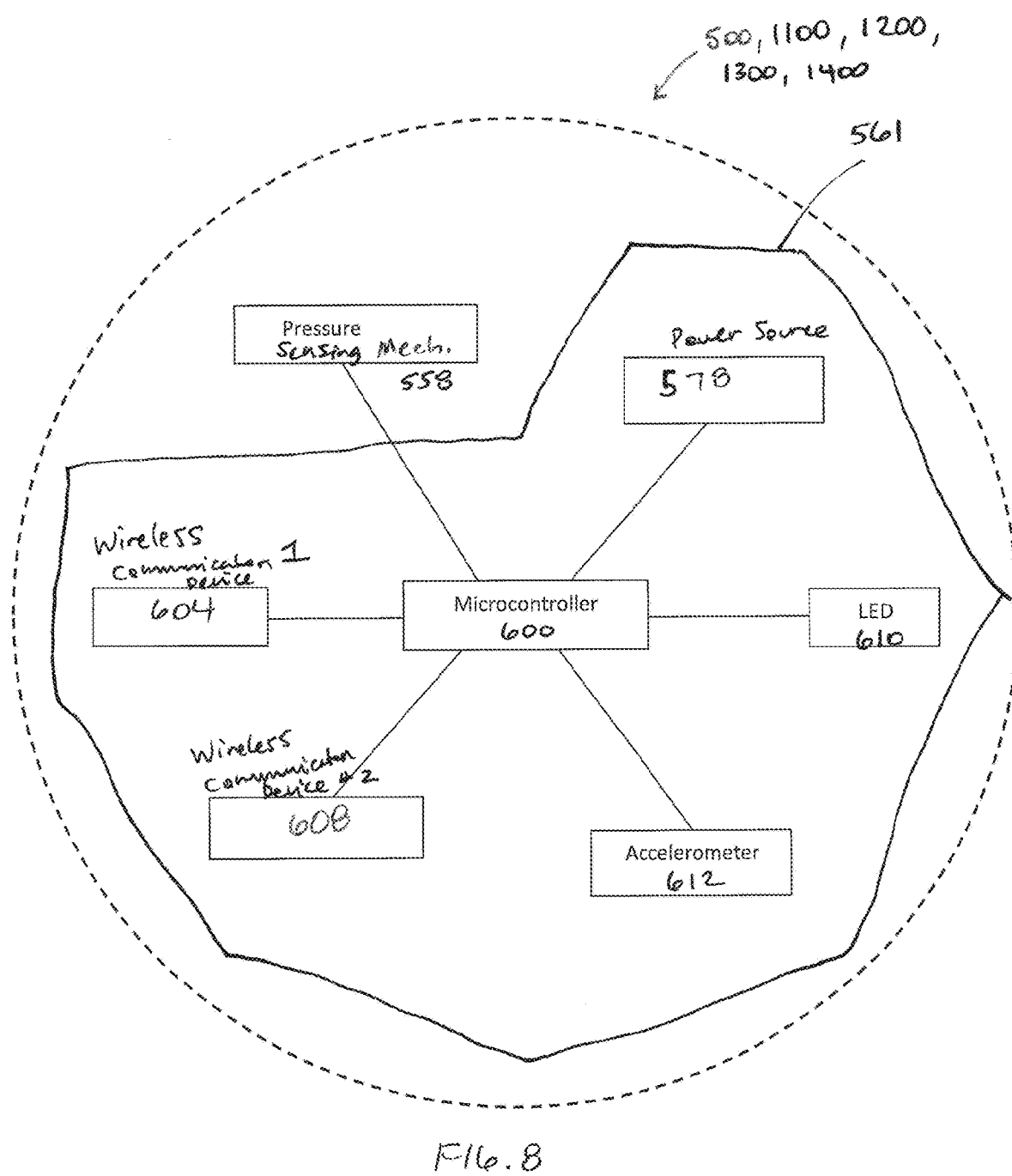
FIG. 8 is a block diagram of various electronic components of the pressure sensor assembly of FIG. 5.
Figure 9:
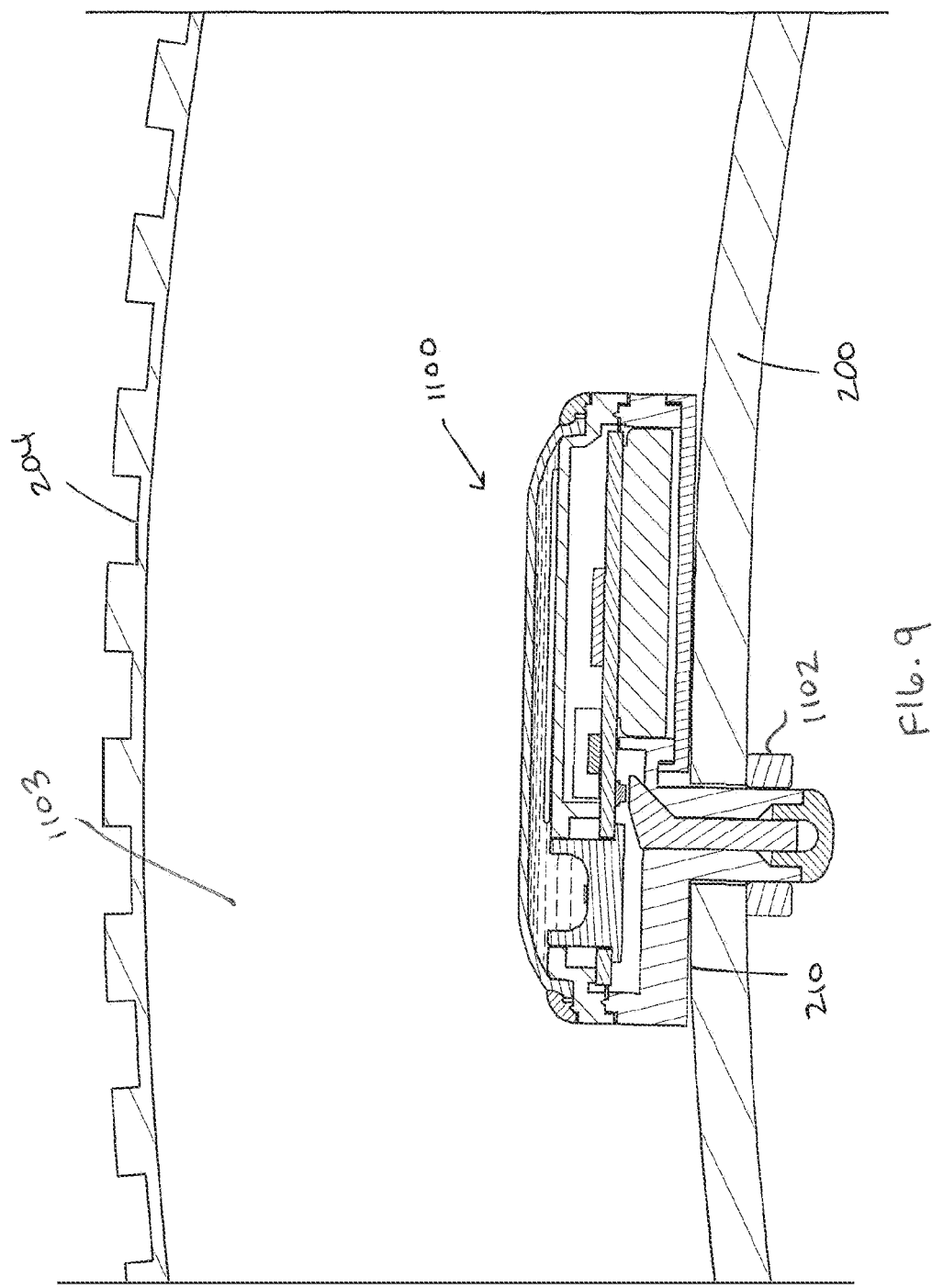
FIG. 9 is a cross-sectional view of a second example of a pressure sensor assembly employed in the bicycle of FIG. 1, showing the pressure sensor assembly attached to a rim via a fastener.

Referring now to FIG. 8, a block diagram of the pressure sensing element 558, the microcontroller 600, the first and second wireless communication devices 604, 608, the light-emitting element 610, and the sensor 612 is provided. As illustrated, each of these components is in some way coupled to the PCB 554 and communicatively connected to the microcontroller 600. It will be appreciated that these connections may be accomplished using any now known or later developed technique.

The microcontroller 600 generally includes a processor and a memory that stores instructions to be executed by the processor. The processor may include a general processor, digital signal processor, an application specific integrated circuit (ASIC), field programmable gate array (FPGA), analog circuit, digital circuit, combinations thereof, or other now known or later developed processor. The processor may be a single device or combinations of devices, such as through shared or parallel processing. The memory may be a volatile memory or a non-volatile memory. The memory may include one or more of a read only memory (ROM), random access memory (RAM), a flash memory, an electronic erasable program read only memory (EEPROM), or other type of memory. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored. The memory is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The first and second wireless communication devices 604, 608 each provide for data and/or signal communications between the pressure sensing assembly 500 (e.g., the processor 600) and other components of the bicycle 100 or one or more external devices (e.g., mobile phones, tablets, headsets). Thus, a user of the bicycle 100 may, for example, use an external device to set a pre-determined pressure set-point for the pressure sensing assembly 500 (indicative of a desired pressure for the pneumatic tire 204), obtain the current pressure of the pneumatic tire 204, change settings of the pressure sensing assembly 500, and/or perform other desired functionality.

In this example, the first wireless communication device 604 includes one or more antennae for facilitating the above-described communications using the ANT+™ wireless protocol, while the second wireless communication device 608 includes one or more radio devices for facilitating the above-described communications using Bluetooth®. In other examples, however, the first and/or second wireless communication devices 604, 608 can facilitate such communications using any now known or later developed standards, including, for example, standards for Internet and other packet switched network transmission (e.g., TCP/IP, UDP/IP, HTML, HTTP, HTTPS), ZigBee, WiFi, and/or AIREA™ standards, or the like. It will also be appreciated that the first and second wireless communication devices 604, 608 can be embodied in a single wireless communication device 604, 608 that facilitates any or all of the above-described communications.

The light-emitting element 610 is generally configured to emit light based upon the pressure sensed or detected by the pressure sensing mechanism 558 and communicated to the microcontroller 600. The light-emitting element 610 in this example is a light-emitting diode (LED), though in other examples, the light emitting element 610 can instead be any now known or later developed source of light. The light-emitting element 610 in this example is configured to emit three different colors light, green light (i.e., light having a wavelength of 495 nm-570 nm), yellow or orange light (i.e., light having a wavelength of 570 nm-590 nm or a wavelength of 590 nm-620 nm) or a blend thereof, and red light (i.e., light having a wavelength of 620 nm-750 nm), with each color of light associated with a different pressure of the pneumatic tire 204 sensed by the pressure sensing assembly 500. As an example, the green light may be emitted when the pressure of the pneumatic tire 204 is greater than a pre-determined set point (e.g., factory set or set by the user of the bicycle 100), the yellow or orange light may be emitted when the pressure of the pneumatic tire 204 is substantially equal to or just below the pre-determined set point, and the red light may be emitted when the pressure of the pneumatic tire 204 is well below the pre-determined set point, indicating that the pressure of the pneumatic tire 204 is very low. Of course, in other examples, the light-emitting element 582 can emit fewer, additional, and/or different colors and/or the light may be emitted based upon different criteria.

The sensor 612 is generally configured to detect or sense one or more actions performed in connection with the bicycle 100. In this example, the sensor 612 takes the form of an accelerometer configured to determine (e.g., recognize, measure, or detect, record) translational and/or rotational motion indicative of one or more user actions performed in connection with the rear wheel 124. As an example, the accelerometer may determine that the wheel 124 is currently spinning (indicative of the bicycle 100 being used), has been spun (e.g., backwards) by the user, has been shaken by the user, has been squeezed by the user (e.g., double squeezed), has been tapped by the user (e.g., two or three times), has been dropped by the user, has been translated by the user (e.g., moved side to side), and the like. Alternatively or additionally, the sensor 612 may include other sensors, e.g., vibration sensors, gyroscopes, touch or tactile sensors, and/or any other known or later developed sensors for the purpose of determining one or more of these or other actions performed in connection with the bicycle 100.

In operation, the microcontroller 600 obtains data indicative of the pressure in the sensing chamber 550 (which is indicative of the pressure of the pneumatic chamber in the pneumatic tire 204) from the pressure sensing mechanism 558. In turn, the microcontroller 600 may transmit the obtained data to the first and second wireless communication devices 604, 608 (e.g., for transmission to other components of the bicycle 100, e.g., the front derailleur 152, the rear derailleur 156, the bicycle computer, and/or external devices), and to the light-emitting element 610 (for emission of light based upon the pressure of the pneumatic chamber in the pneumatic tire 204).

However, because the pressure sensing mechanism 558, the first and second wireless communication devices 604, 608, and the light-emitting element 610 tend to quite quickly drain the power source 578, the pressure sensing assembly 500 may be operable in different power modes so as to minimize usage of these components whenever possible. In this example, the pressure sensing assembly 500 is operable in three different modes: a wake mode, a sleep mode, and a deep sleep mode. In other examples, the pressure sensing assembly 500 may be operable in more or less and/or different modes. As an example, the pressure sensing assembly 500 may only be operable in a wake mode and a sleep mode.

When the pressure sensing assembly 500 is in the wake mode, the sensing assembly 500 is fully operational. When, however, the pressure sensing assembly 500 is in the sleep mode, the assembly 500 is operational, but the light-emitting element 610 is turned off, one or both of the first and second wireless communication devices 604, 608 is/are turned off, and the pressure sensing mechanism 558 senses or detects pressure at a reduced rate, such that the assembly 500 utilizes less power. Finally, when the pressure sensing assembly 500 is in the deep sleep mode, the assembly 500 uses the least amount of power, as the pressure sensing mechanism 558, the devices 604, 608, and the light-emitting element 610 are turned off, while the microprocessor 600 and the sensor 612 are minimally active so that they may detect a wakeup signal that instructs the pressure sensing assembly 500 to return to the sleep mode or the wake mode.

The pressure sensing assembly 500 generally switches between these modes based upon data obtained by the pressure sensing mechanism 558, the sensor 612, pre-determined settings, settings input by a user of the bicycle 100 (e.g., via an external device), for other reasons, or combinations thereof. As an example, the pressure sensing assembly 500 may operate in the wake mode when the power sensing assembly 500 is first powered up, when a user of the bicycle 100 is actively configuring the assembly 500 (e.g., via an external device), responsive to a wake-up signal sent by an external device, and when the pressure in the pneumatic tire 204 changes. The pressure sensing assembly 500 may switch to the sleep mode when, for example, the pressure of the pneumatic chamber in the pneumatic tire 204 has not changed for a pre-determined amount of time but the sensor 612 detects that the bicycle 100 is being used, and may switch to the deep sleep mode when, for example, the sensor 612 does not detect any motion associated with the wheel(s) 120, 124.

Referring back to FIGS. 6 and 7, the pressure sensor assembly 500 further includes a light-transmitting element in the form of a light pipe 620, which is preferably made of a transparent material such as polycarbonate or acrylic. The light pipe 620 is communication with the light-emitting element 610 in order to distribute or transmit the light emitted by the light-emitting element 610 to the user of the bicycle 100. To this end, the light pipe 620 is disposed in the opening 530 such that a first end 624 of the light pipe 620 is immediately adjacent the PCB 554 and, more particularly, the LED 610, and a second end 628 of the light pipe 620 is positioned at or adjacent an end 632 of the second wall portion 522. While not visible in FIGS. 5-7, it will be appreciated that the end 632 of the second wall portion 522 and the second end 628 of the light pipe 620 extend through an opening formed in the tire bed 208 of the rim, such that the ends 628, 632 are outside of the rim 200. A lens 636 is coupled to the second wall portion 522 to retain the light pipe 620 within the opening 530 and to focus and display light emitted by the LED 610 and transmitted through the light pipe 620. The lens 636, which is preferably made of a transparent material like the light pipe 620, has a first portion 640 that is disposed within the opening 530 and surrounds the second end 628 of the light pipe 620, and a second portion 644 that seats against the end 632 of the second wall portion 522, is disposed outside of the opening 530 and, while not visible in FIGS. 5-7, is also disposed outside of the opening formed in the rim 200. Thus, a portion of the lens 636 is visible to the user of the bicycle 100, such that the user can see the light emitted by the LED 610. And because the light-emitting element 610 emits light based upon the pressure of the pneumatic chamber in the pneumatic tire 204 as sensed by the pressure sensing assembly 500, the user of the bicycle 100 can quickly and easily visually obtain the pressure of the pneumatic tire 204.

FIGS. 9-12 illustrate a second example of the pressure sensing assembly 104, in the form of a pressure sensing assembly 1100, that may be removably attached to the rim 200, particularly the tire bed 208 of the rim 200, via a fastener 1102 (e.g., a nut), and operatively coupled to a pneumatic chamber 1103 in the pneumatic tire 204. The pressure sensing assembly 1100 includes some of the same components as the pressure sensing assembly 500, with common reference numerals used for those components, but differs from the pressure sensing assembly 500 in the manner described below.

First, the pressure sensing assembly 1100 has a housing 1104 that differs from the housing 504 of the pressure sensing assembly 500. The housing 1104 in this example is a two-part housing formed by a first, or top, housing portion 1108 and a second, or bottom, housing portion 1112 coupled to the first housing portion 1108 (e.g., via a snap-fit or other connection). The first housing portion 1108 has a substantially annular shape defined by a first portion 1116 and a second portion 1120 that extends upward and inward from and has a smaller outer diameter than the first portion 1116. Thus, the second portion 1120 is shaped to prevent the pressure transmitting member 508 from closing off the sensing chamber A circular aperture 1124 extends through the first and second portions 1116 and 1120. The first housing portion 1108 also includes a V-shaped track 1126 that is formed in the second portion 1120 to prevent the pressure transmitting member 508 from pinching off and isolating the pressure sensing mechanism 558. The second housing portion 1112, meanwhile, has a structure that is substantially similar to the housing 504 described above, but, unlike the housing 504, the second housing portion 1112 includes a circular aperture 1128 sized to receive the power source 578 therein.

Second, the pressure sensing assembly 1100 includes two chambers instead of the single sensing chamber found in the pressure sensing assembly 500. More particularly, the pressure sensing assembly includes a first, or sensing, chamber 1150 and a second chamber 1154. The first chamber 1150 is a sealed chamber defined by the first housing portion 1108 and the pressure transmitting wall 508. By comparing FIG. 7 and FIG. 13, it will be appreciated that the first chamber 1150 has a smaller volume than the sensing chamber 550 described above. The second chamber 1154 is defined by the first and second housing portions 1108, 1112 and a door 1158 removably coupled to the second housing portion 1112. Like the first chamber 1150, the second chamber 1154 is sealed, with a sealing element 1160, e.g., an O-ring made of Buna-N or any other suitable material, arranged on the substrate 560 of the PCBA 554 and surrounding the pressure sensing mechanism 558 to ensure that the second chamber 1154 is sealed off from the first chamber 1150.

Figure 10:
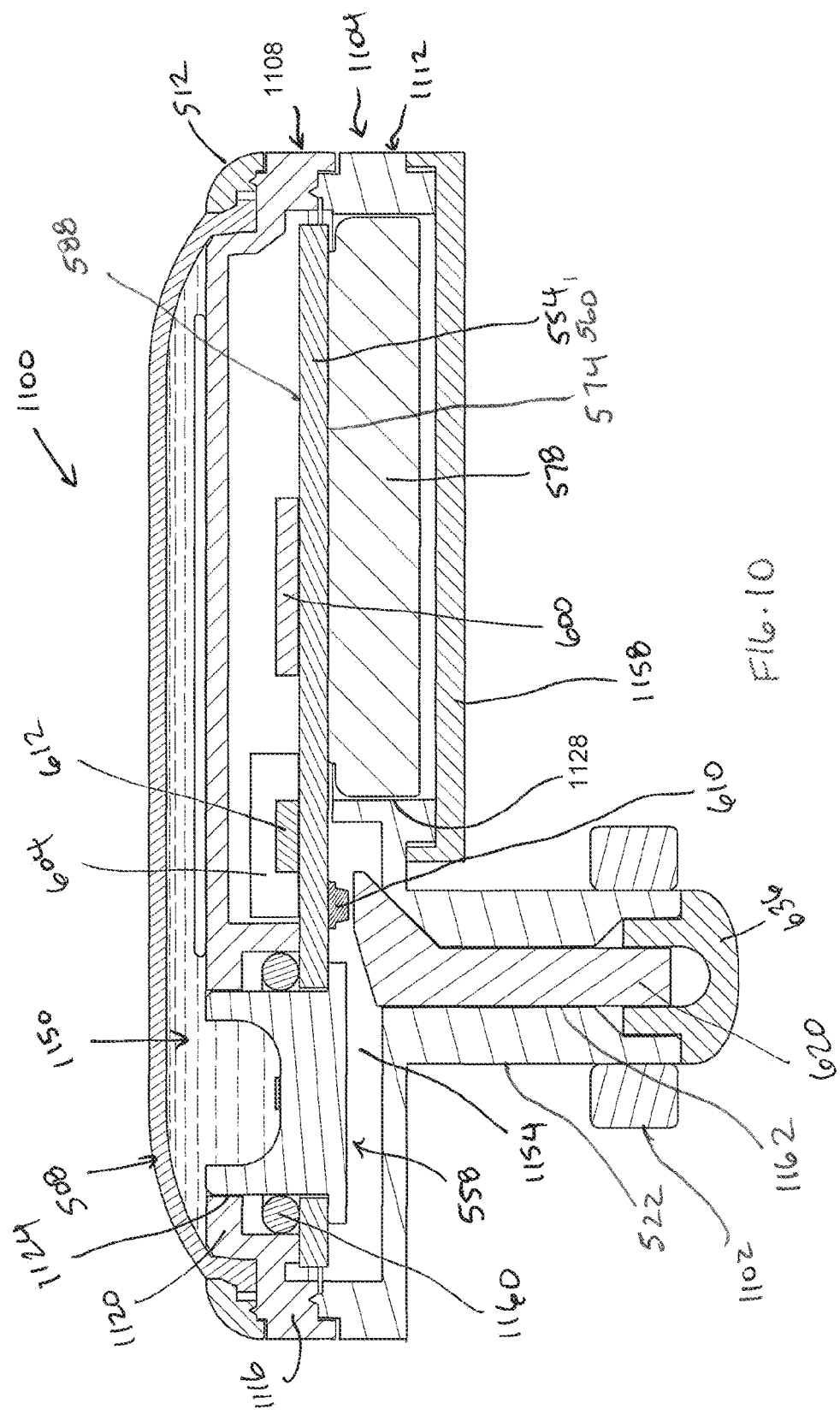
FIG. 10 is a cross-sectional view of the second example of the pressure sensor assembly of FIG. 9 when removed from the rim.
Figure 12:
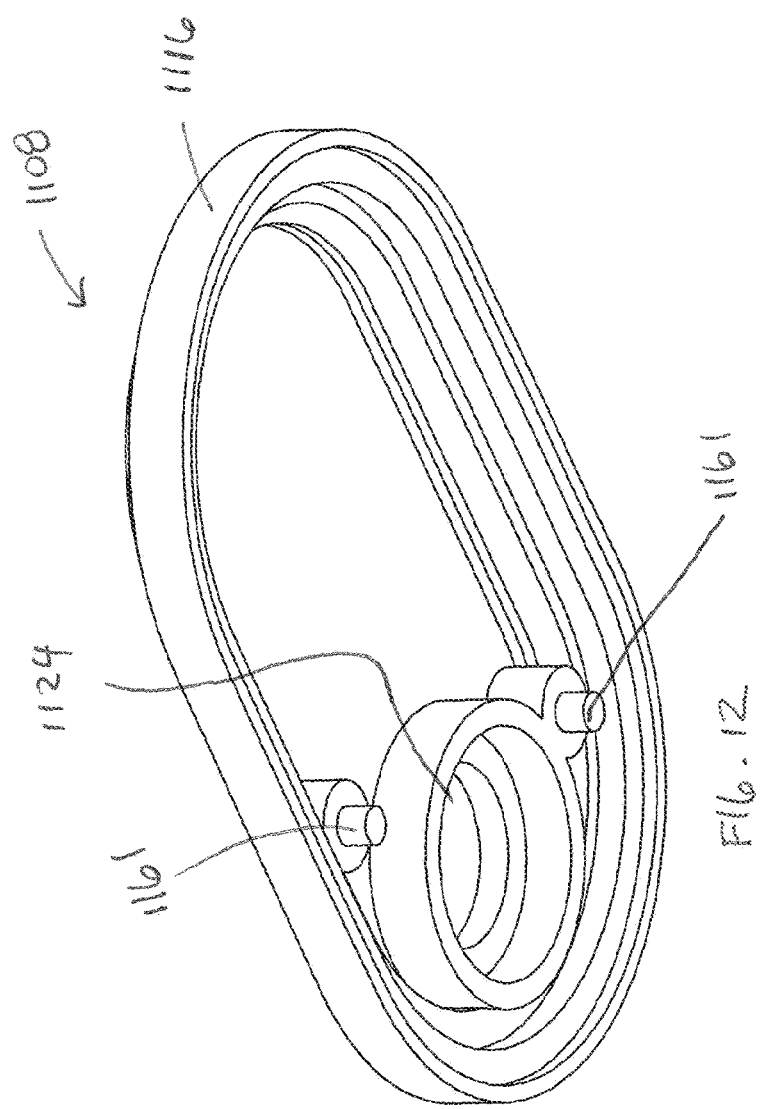
FIG. 12 is a cross-sectional view of a third example of a pressure sensor assembly employed in the bicycle of FIG. 1, showing the pressure sensor assembly attached to a rim via adhesive.

As best illustrated in FIG. 10, the first housing portion 1108, and more specifically the second portion 1120, is shaped to prevent the pressure transmitting member 508 from closing off the sensing chamber 1154. This may be particularly important when, for example, the sensing chamber 1154 is filled with a compressible fluid such as air or nitrogen, whereby the second portion 1120 may provide flow paths for the pressure to remain equal in the sensing chamber 1154 and at the pressure sensing mechanism 558, thereby ensuring that accurate readings of the chamber 1154 are still possible in a compressed state. Additionally, as illustrated in FIG. 12, the first housing portion 1108 optionally includes a pair of protrusions 1161 (e.g., pegs) that extend outwardly (downwardly in this case) from the first portion 1116. The protrusions 1161 are arranged to help separate, and fluidly isolate, the PCBA 554 from the sensing chamber 1150.

Figure 11:
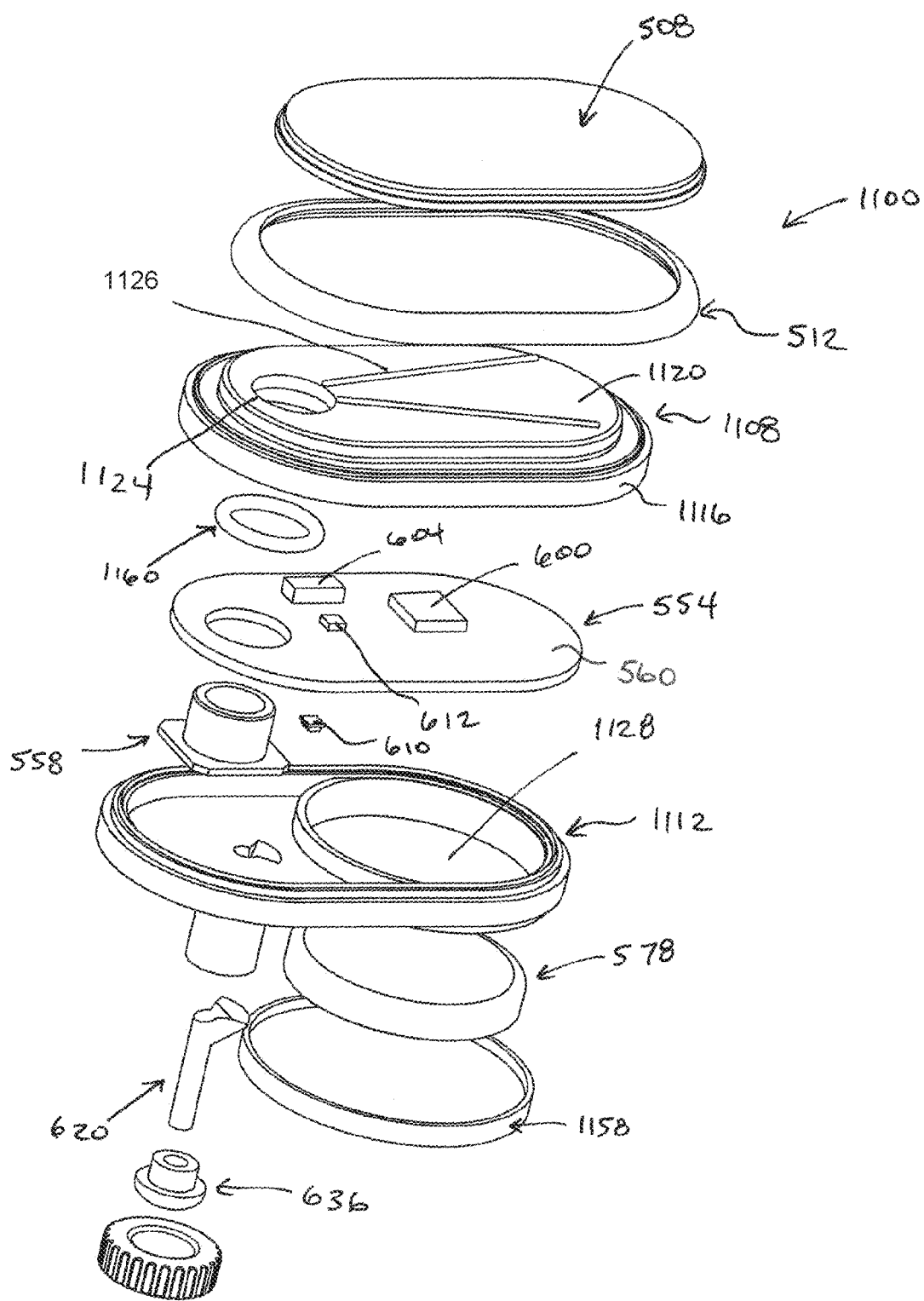
FIG. 11 is an exploded view of the second example of the pressure sensor assembly of FIG. 10.

As best illustrated in FIG. 11, the substrate 560, the power source 578, the microcontroller 600, and the light pipe 620 are disposed in the second chamber 1154, with the substrate 560 arranged between the first and second housing portions 1108, 1112, the power source 578 disposed in the aperture 1128, and the light pipe 620 arranged in an opening 1162 that is identical to the opening 530. While the pressure sensing mechanism 558 extends through the aperture 1124 such that it is coupled to the substrate 560, the pressure sensing mechanism 558 is nonetheless positioned in fluid communication with the sensing chamber 1150. This allows the pressure sensing mechanism 558 to sense or detect the pressure in the sensing chamber 1150. The pressure sensing mechanism 558 can in turn generate a signal indicative of the sensed or detected pressure (in some cases, this will be accomplished with the aid of the processor of the microcontroller). The signal can be communicated to the PCBA 554 for transmission to other components of the bicycle 100 (e.g., the light-emitting element 610 and the light pipe 620 of the pressure sensing assembly 1100). At the same time, because the first and second chambers 1150, 1154 are sealed, the second chamber 1154 is fluidly isolated from the first chamber 1150. Thus, when the first chamber 1150 is filled with a pressure transmitting medium (e.g., an incompressible fluid, i.e., a fluid that does not compress at working pressures), components such as the PCBA 554 and the power source 578 are beneficially isolated from that fluid, thereby protecting those components.

Third, because the power source 578 is in the second chamber 1154, which is partially defined by the removable door 1158, the power source 578 can be removed and repaired or replaced by simply removing the door 1158 from the housing 1104. Fourth, because of the positioning of the power source 578, the microprocessor 600, the first and second wireless communication devices 604, 608, and the sensor 612 are, in this example, arranged on a top surface 588 of the substrate 560, as opposed to a bottom surface 574 of the substrate 560 (as is the case in the example described in connection with FIGS. 5-7).

Notwithstanding the aforementioned differences between the pressure sensing assembly 500 and the pressure sensing assembly 1100, the pressure sensing assembly 1100 operates to detect or sense the pressure of the pneumatic chamber in the pneumatic tire 204 in a similar manner as the pressure sensing assembly 500. Additionally, the pressure sensing assembly 1100 can convey (e.g., visually indicate) the detected or sensed pressure to the user of the bicycle 100 in a similar manner as the pressure sensing assembly 500.

Figure 13:
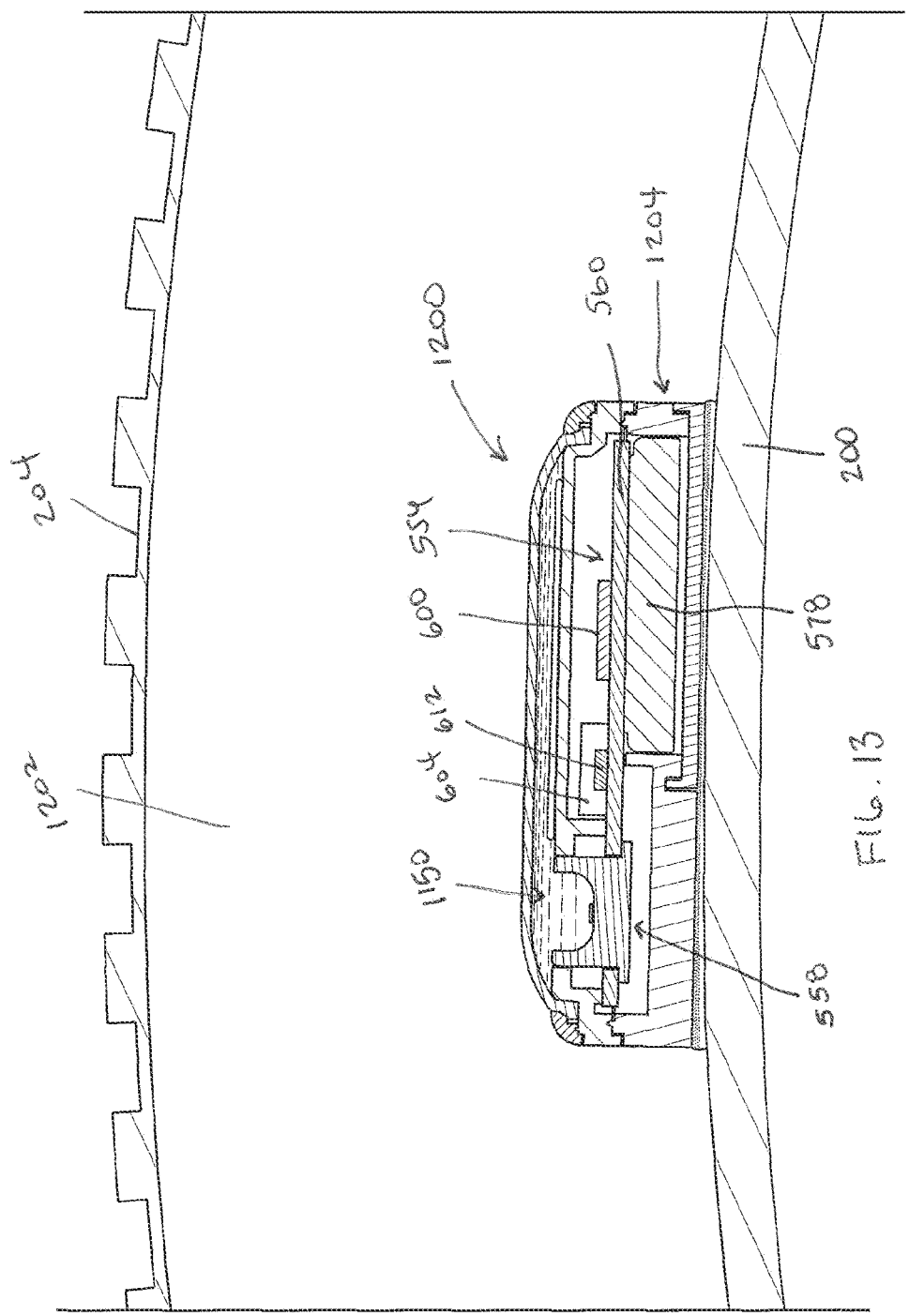
FIG. 13 is a perspective view of an underside of a component of the second example of the pressure sensor assembly.

FIG. 13 illustrates a third example of the pressure sensing assembly 104, in the form of pressure sensing assembly 1200, that may be removably attached to the rim 200, particularly the tire bed 208 of the rim 200, and operatively coupled to a pneumatic chamber 1202 in the pneumatic tire 204. The pressure sensing assembly 1200 is substantially similar to the pressure sensing assembly 1100, with common reference numerals used for common components. However, the pressure sensing assembly 1200 differs from the pressure sensing assembly 1100 in the manner described below.

First, unlike the pressure sensing assembly 1100, the pressure sensing assembly 1200 does not include the light-emitting element 610, the light pipe 620, or the lens 636. Thus, the pressure sensing assembly 1200 has a housing 1204 that is slightly different from the housing 1104, in that it does not include a second wall portion like the wall portion 522 or an opening like the opening 1162. As a result, it will be appreciated that the pressure sensing assembly 1200 may be entirely disposed within the tire bed 208 of the rim 200 (i.e., no part of the pressure sensing assembly 1200 will be visible to the user of the bicycle 100). Adhesive may be used to secure the pressure sensing assembly 1200 within the tire bed 208 of the rim 200.

Second, unlike the pressure sensing assembly 1100, the sensing chamber 1150 of the pressure sensing assembly 1200 is filed with a pressure transmitting medium. The pressure transmitting medium is preferably an incompressible fluid, such as water, oil, brake fluid (e.g., DOT), or silicone gel. However, in some cases, a compressible fluid, such as a gas (e.g., nitrogen, air) may be used. In either case, the presence of fluid in the sensing chamber 1150 may help to protect the electronic components of the pressure sensing assembly 1200, e.g., the PCBA 554, the pressure sensing mechanism 558, and the power source 578.

Figure 14:
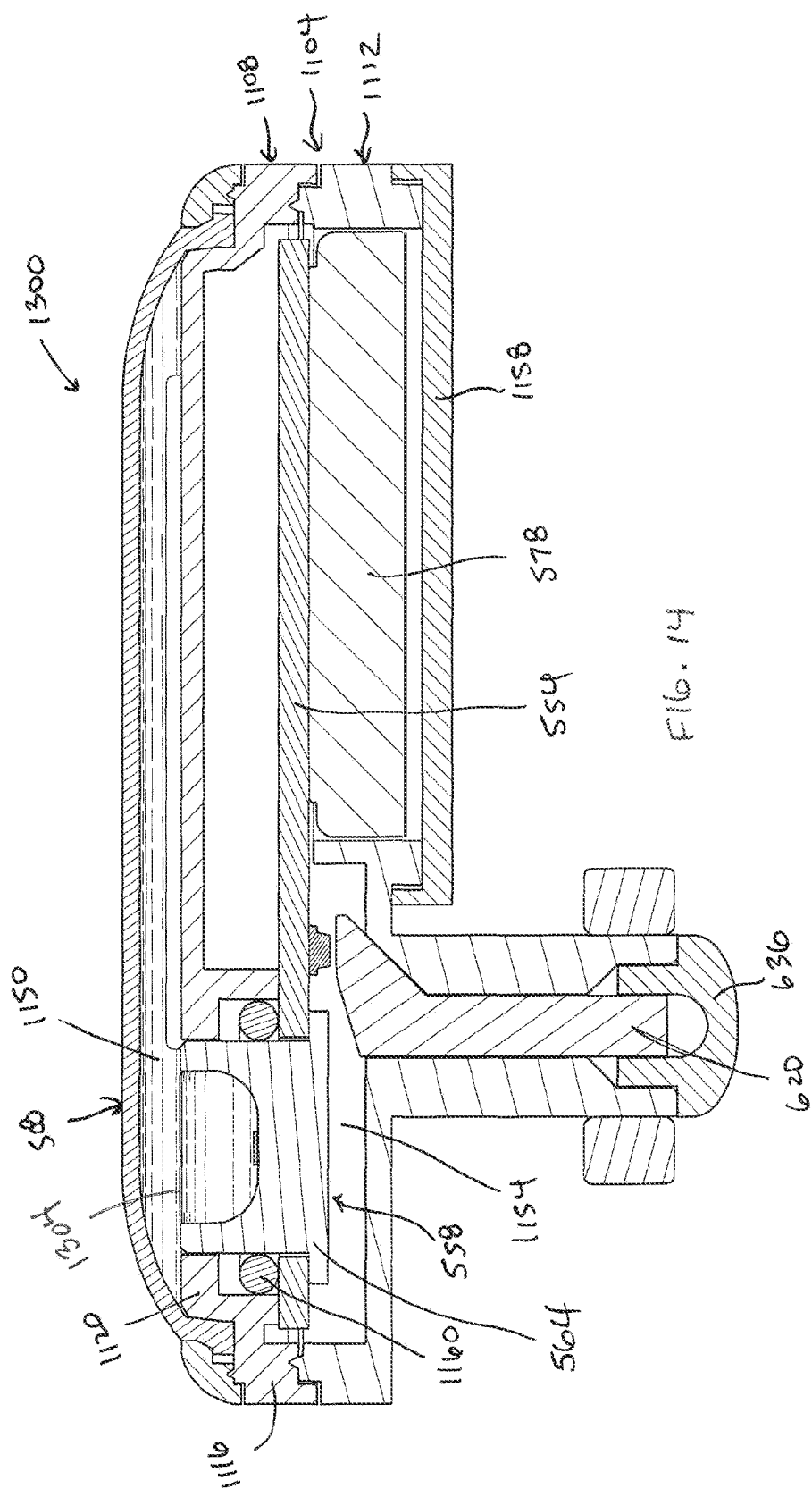
FIG. 14 is a cross-sectional view of a fourth example of a pressure sensor assembly employed in the bicycle of FIG. 1.

FIG. 14 illustrates a fourth example of the pressure sensing assembly 104, in the form of a pressure sensing assembly 1300, that may be removably attached to the rim 200, particularly the tire bed 208 of the rim 200, and operatively coupled to the pneumatic tire 204. The pressure sensing assembly 1300 is substantially similar to the pressure sensing assembly 1100, with common reference numerals used for those components. The first difference between the pressure sensing assembly 1100 and the pressure sensing assembly 1300 relates to the positioning of some of the components coupled to the PCB 554. More particularly, in the pressure sensing element 1300, the microcontroller 600, the first and second wireless communication devices 604, 608, and the sensor 612 are arranged on a bottom surface of the PCB 554. It will be appreciated that these components are not visible in FIG. 14 because of the position of the power source 578 in the second chamber 1154. Second, unlike the pressure sensing assembly 1100, the pressure sensing assembly 1300 includes a second pressure transmitting member 1304, such as a flexible or compliant membrane, coupled to the sensor housing 564 and positioned over the pressure sensing element 565. So positioned, the membrane 1304 protects the pressure sensing element 565 by fluidly isolating the pressure sensing element 565 from the sensing chamber 1150.

Figure 15:
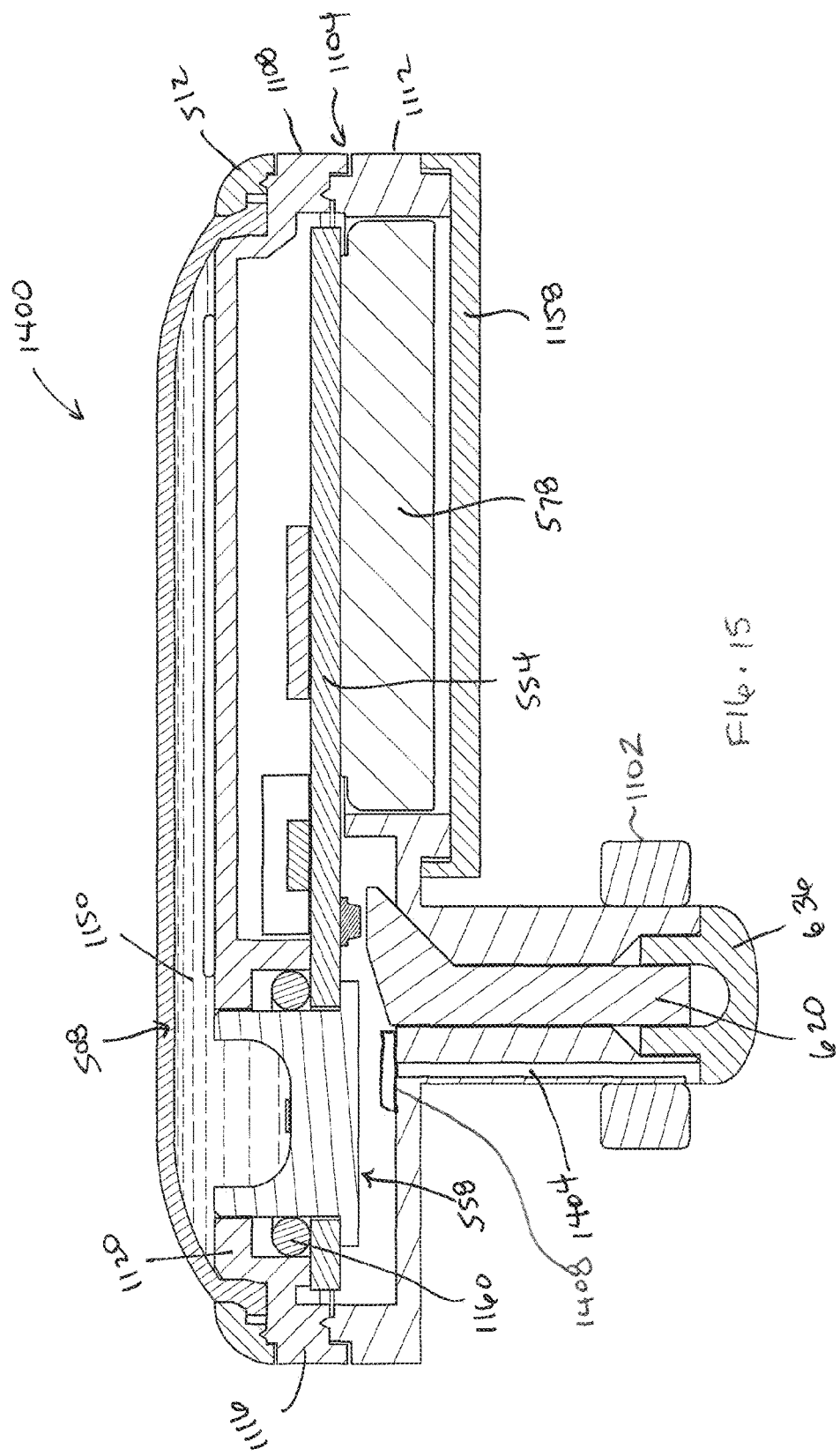
FIG. 15 is a cross-sectional view of a fifth example of a pressure sensor assembly employed in the bicycle of FIG. 1.
Figure 16:
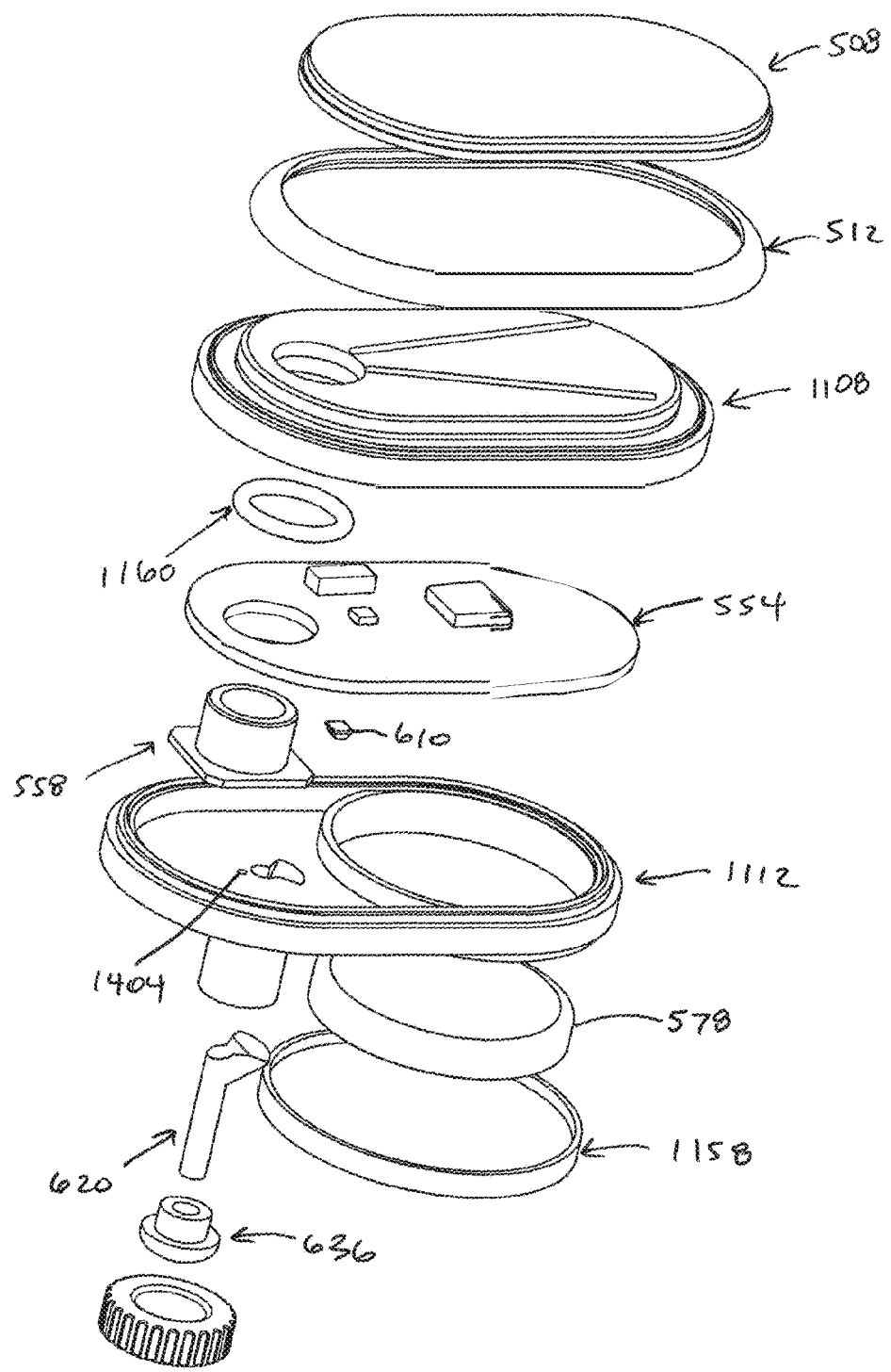
FIG. 16 is an exploded view of the pressure sensor assembly of FIG. 15.

FIGS. 15 and 16 illustrate a fifth example of the pressure sensing assembly 104, in the form of a pressure sensing assembly 1400, that may be removably attached to the rim 200, particularly the tire bed 208 of the rim 200, and operatively coupled to the pneumatic tire 204. The pressure sensing assembly 1400 is substantially similar to the pressure sensing assembly 1100, with common reference numerals used for those components. However, unlike the pressure sensing assembly 1100, the pressure sensing assembly 1400 includes a reference port 1404 for the pressure sensing element 578. The reference port 1404 is formed through portions of the second housing portion 1112 and fluidly couples the second chamber 1154 with atmosphere. Thus, the pressure sensing element 565, which is positioned in the second chamber 1154, is in fluid communication with atmosphere. As a result, in this example the pressure sensor 565 operates as a relative pressure sensor, whereby the atmospheric pressure is used as a reference pressure and the pressure sensing element 565 detects or sense the pressure in the first chamber 1150, and, thus, the pneumatic chamber in the tire 204, relative to that reference pressure. This is contrary to the examples described above, none of which include a reference port. Thus, in those examples, the pressure sensing element 565 operates as an absolute pressure sensor, whereby the pressure sensing element 565 detects or senses the pressure in the sense chamber, and, thus, the tire 204, relative to absolute zero.

Additionally, unlike the pressure sensing assembly 1100, the pressure sensing assembly 1400 optionally includes a gas permeable but otherwise impermeable barrier 1408. The barrier 1408 is arranged between the sensing mechanism 558 (which includes the pressure sensor 567) and the reference port 1404. So positioned, the barrier 1408 allows the pressure sensor 567 to be in pressure communication with the atmosphere (via the reference port 1404) but prevents fluid such as incompressible fluid from flowing between the atmosphere and the pressure sensor 567.

Figure 17:
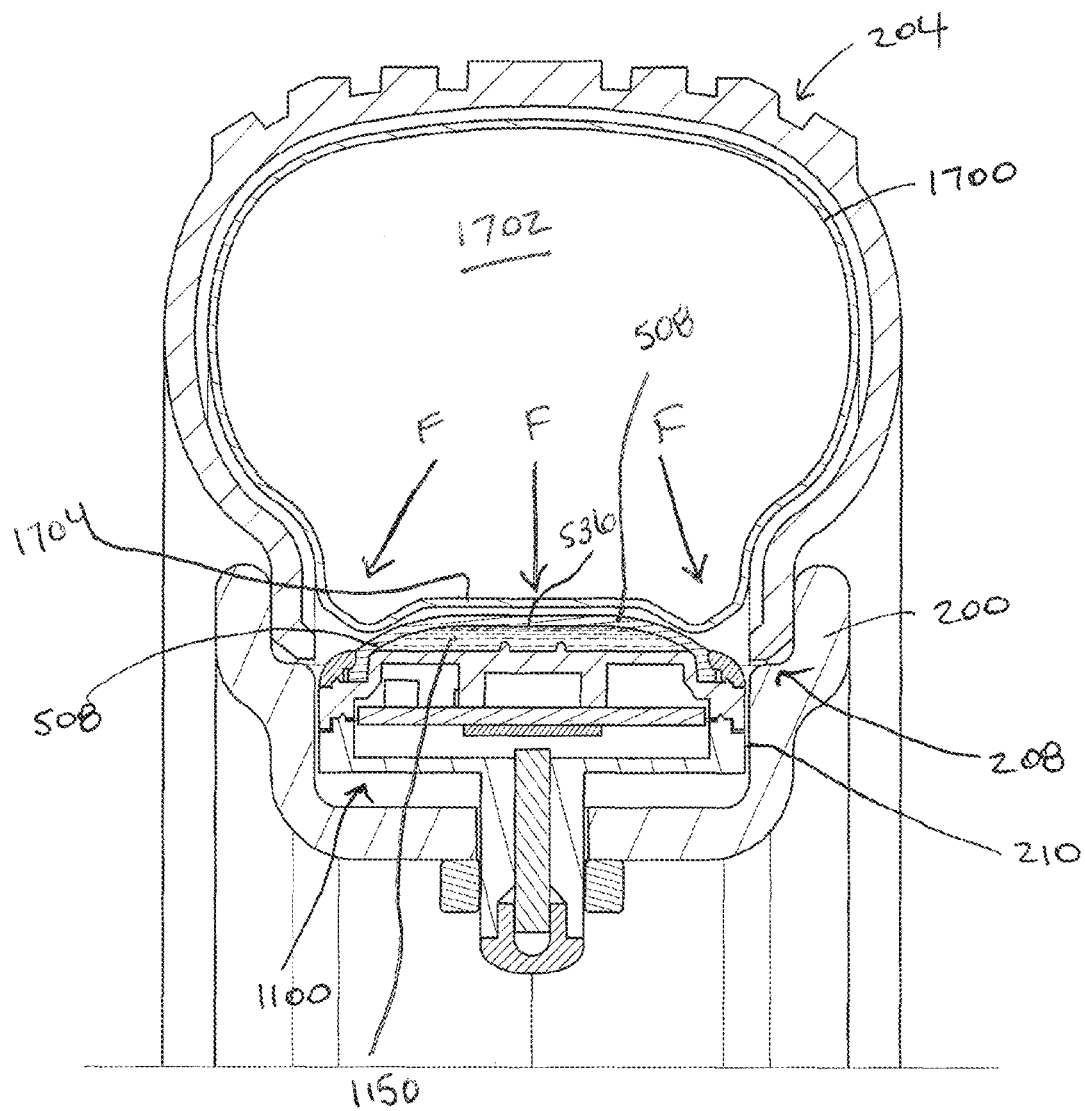
FIG. 17 is a cross-sectional view of the second example of the pressure sensor assembly used in connection with a pneumatic tire having an inner tube.
Figure 18:
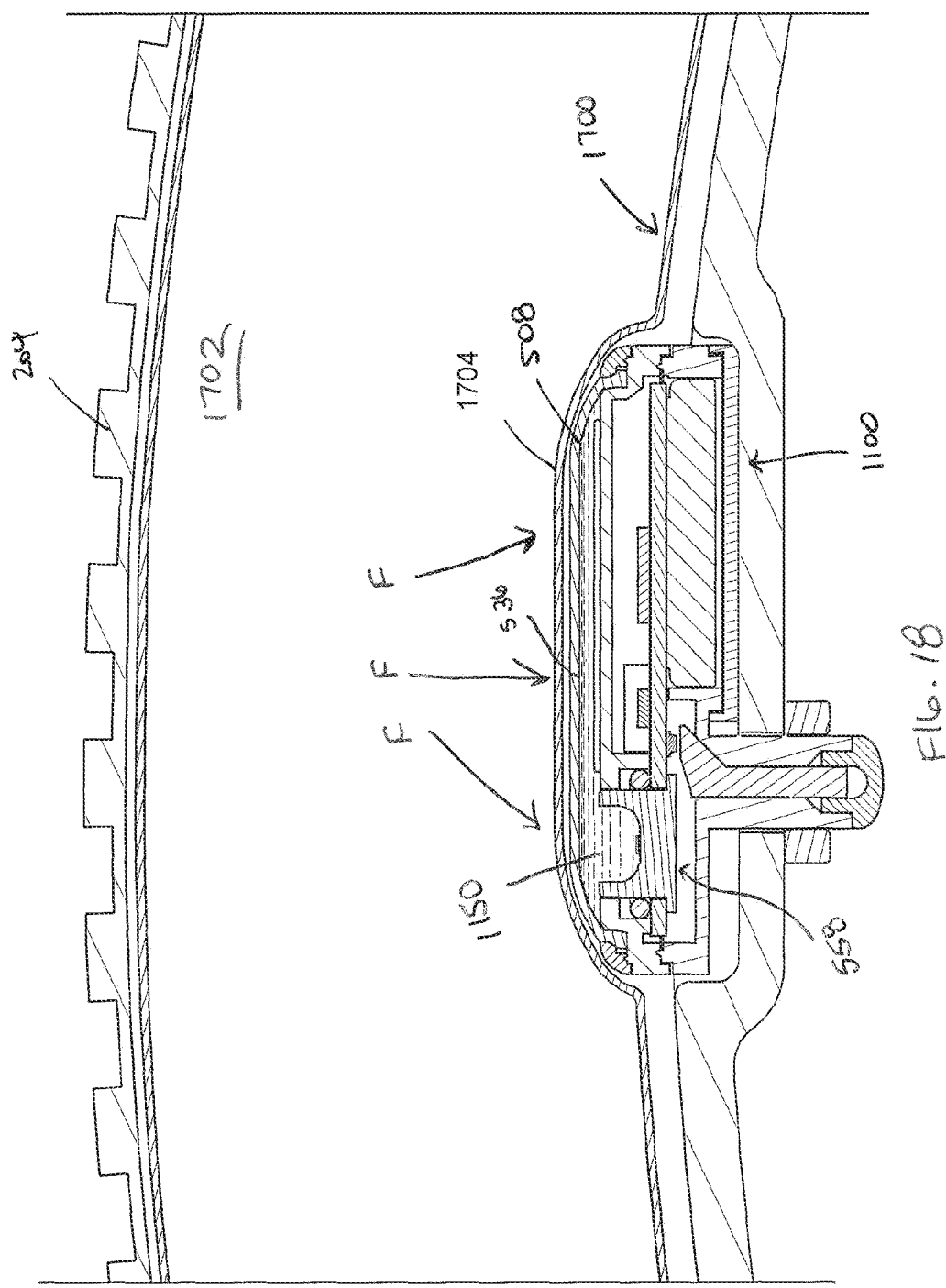
FIG. 18 is another cross-sectional view of the second example of the pressure sensor assembly used in connection with a pneumatic tire having an inner tube.
Figure 19:
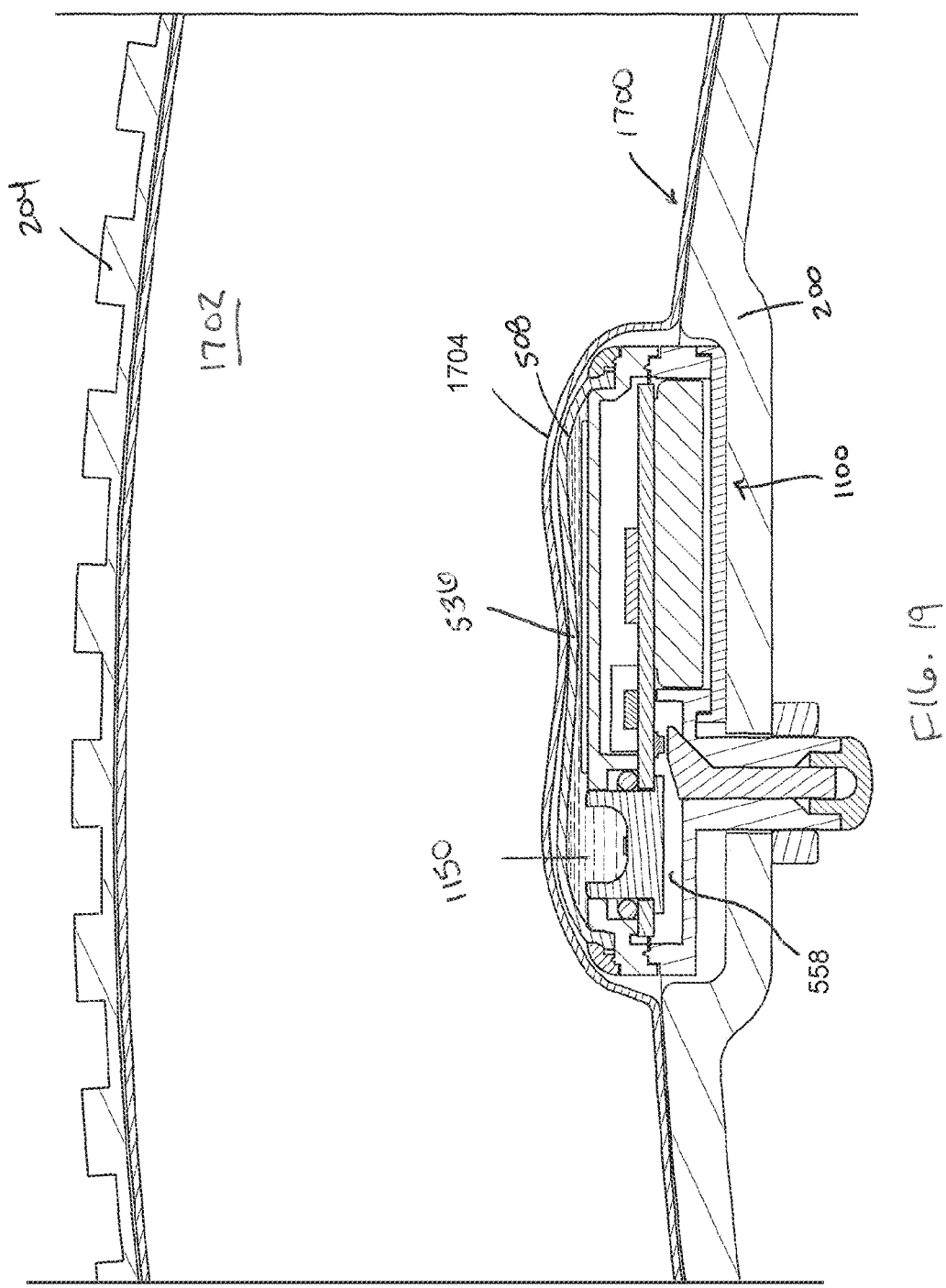
FIG. 19 is similar to FIG. 18, but shows the pressure sensor assembly responding to a change in pressure in the pneumatic tire.
Figure 20:
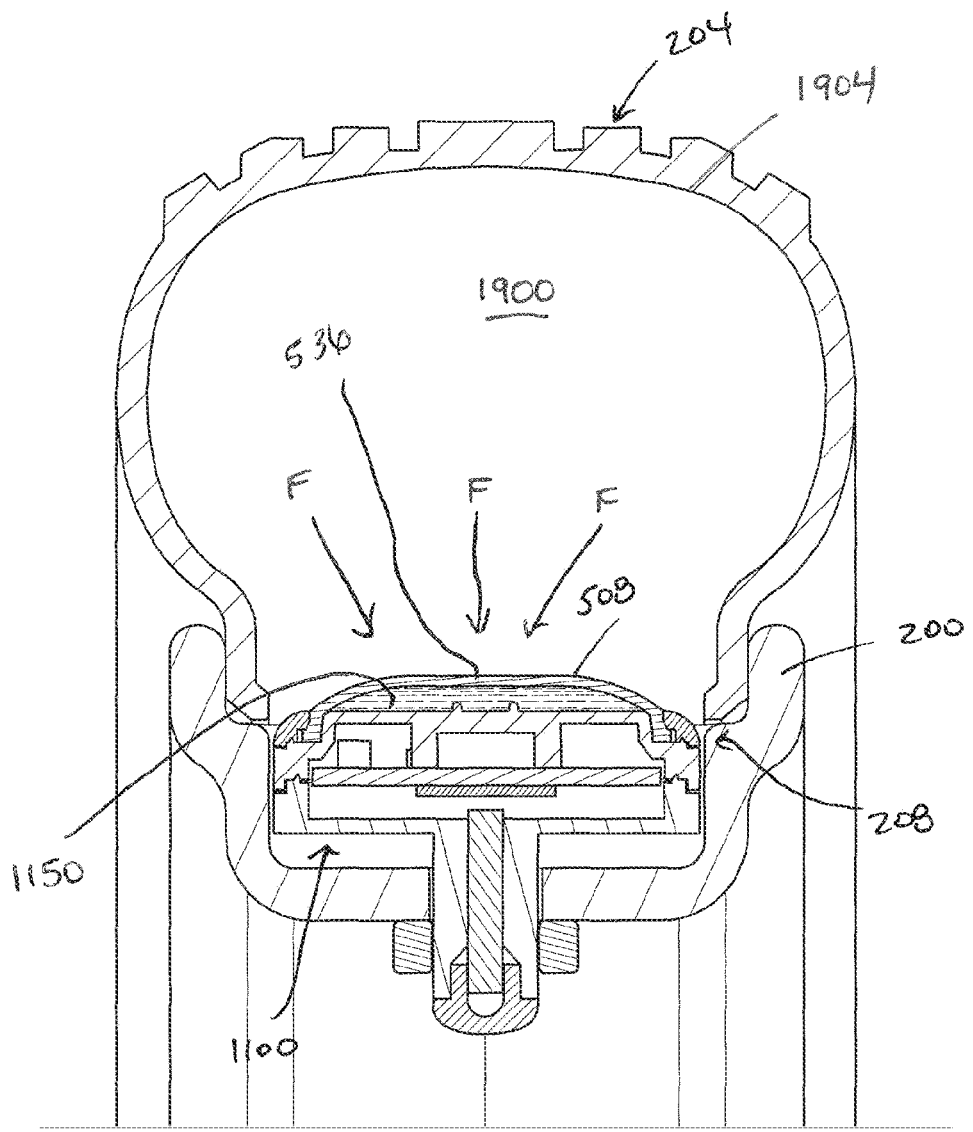
FIG. 20 is a cross-sectional view of the second example of the pressure sensor assembly used in connection with a pneumatic tire that does not have an inner tube.
Figure 21:
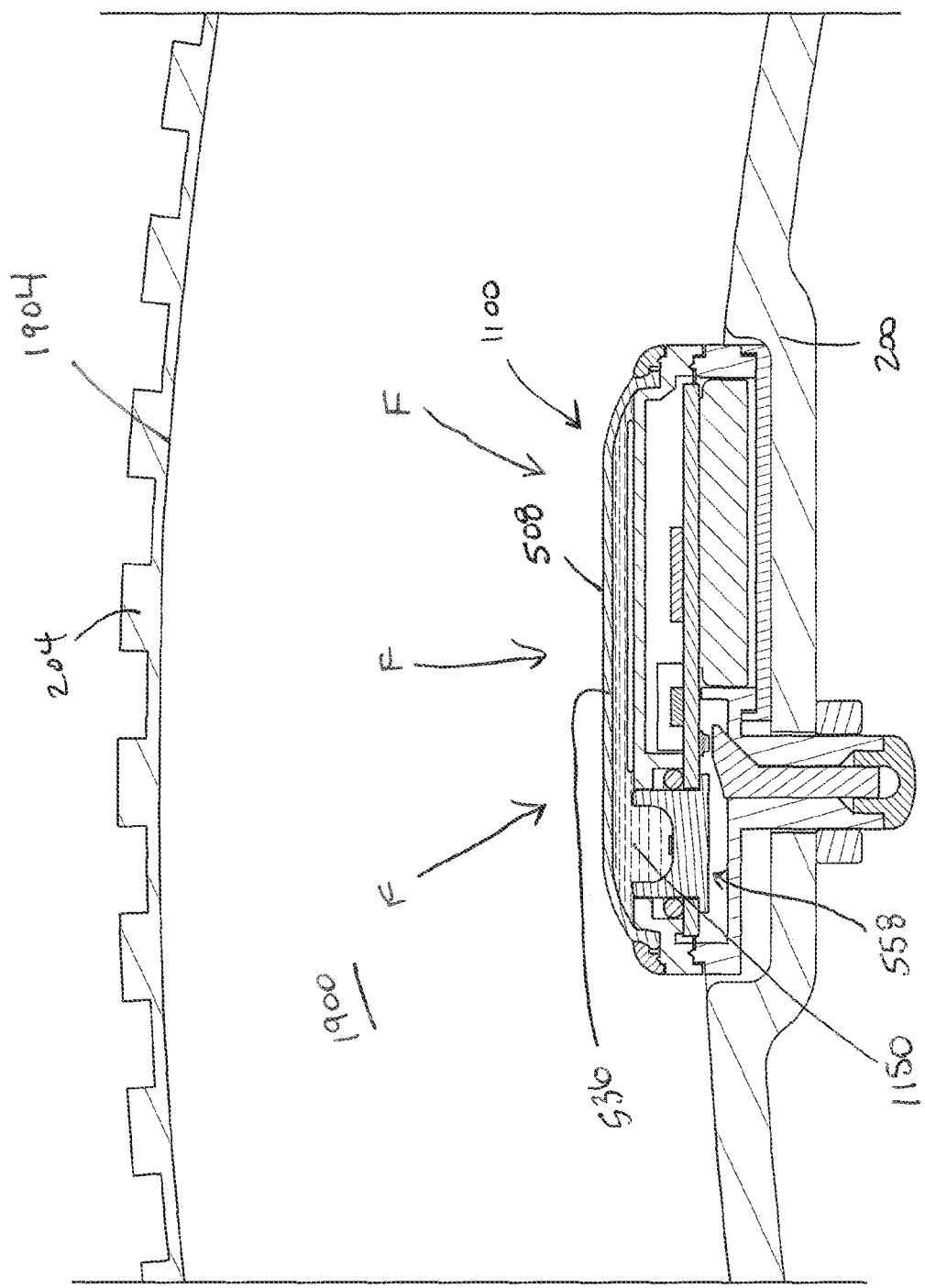
FIG. 21 is another cross-sectional view of the second example of the pressure sensor assembly used in connection with a pneumatic tire that does not have an inner tube.
Figure 22:
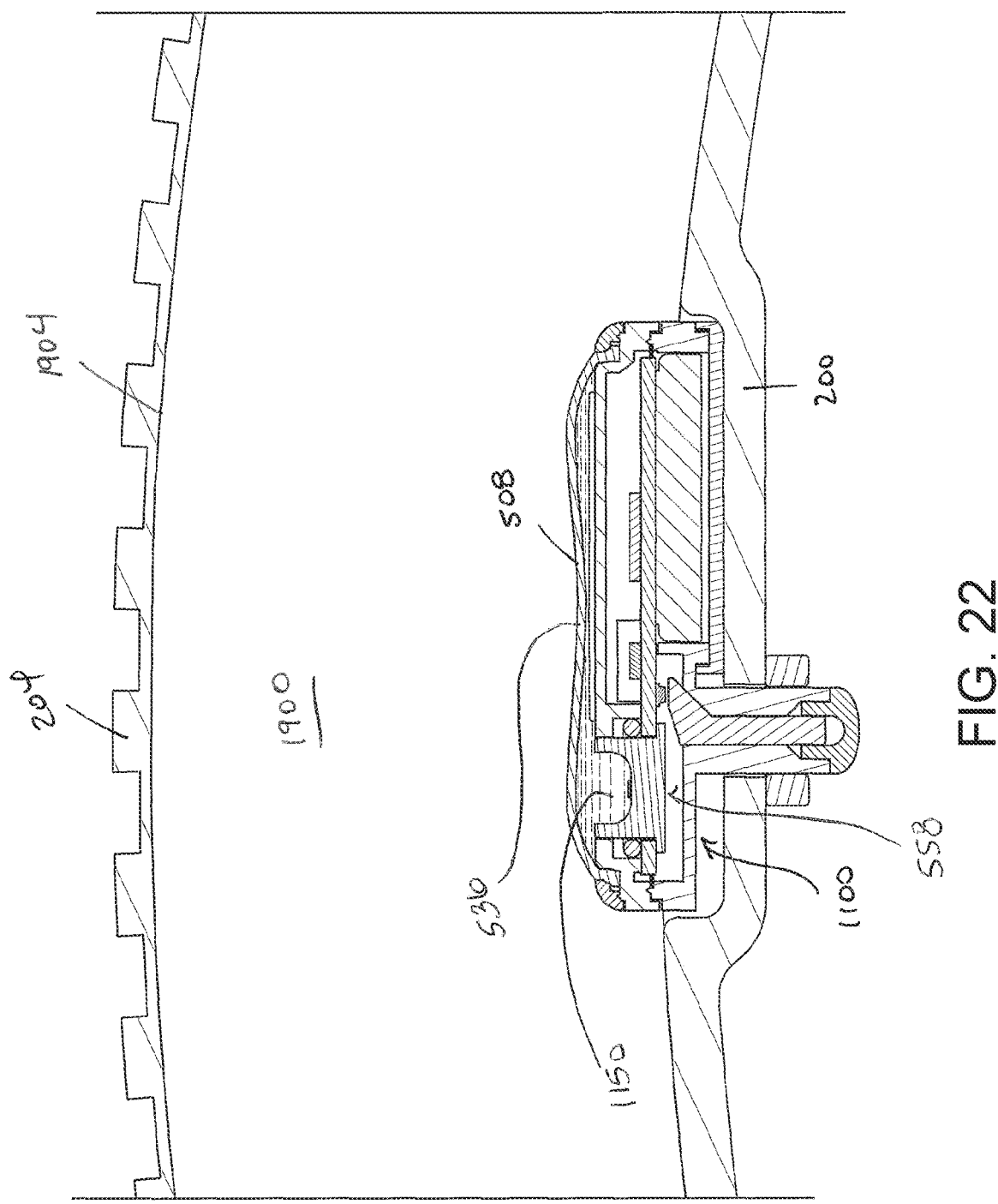
FIG. 22 is similar to FIG. 21, but shows the pressure sensor assembly responding to a change in pressure in the pneumatic tire.

As briefly discussed above, any of the pressure sensing assemblies described herein may be used in connection with a tubed tire (i.e., a tire having an inner tube), whereby the pneumatic chamber is defined by the inner tube, or a tubeless tire (i.e., a tire that does not have an inner tube), whereby the pneumatic tire is defined by the tire itself and, optionally, a seal of the tire. As an example, FIGS. 17-19 illustrate the pressure sensing assembly 1100 used in connection with a pneumatic tire 204 in the form of a tubed tire having an inner tube 1700. Thus, in this example, a pneumatic chamber 1702 defined by the inner tube 1700 applies an outward (in this case downward) force F on the pressure transmitting member 508 that corresponds to the pressure of the pneumatic chamber 1702. As another example, FIGS. 20-22 illustrate the same pressure sensing assembly 1100 used in connection with a pneumatic tire 204 in the form of a tubeless tire (i.e., a tire that does not have an inner tube such as the inner tube 1700). Thus, in this example, a pneumatic chamber 1900 defined by an interior 1904 of the pneumatic tire 204 applies an outward (in this case downward) force F on the pressure transmitting member 508 based on the pressure of the pneumatic chamber 1900.

As illustrated in FIGS. 17 and 18, the pressure transmitting member 508, specifically the central portion 536 of the pressure transmitting member 508, directly engages a similarly shaped bottom wall 1704 of the inner tube 1700 of the pneumatic tire 204. The pressure inside the pneumatic chamber 1702 defined by the inner tube 1700 generates the outward force F, which is applied to the pressure transmitting member 508 via the bottom wall 1704 and corresponds to the pressure of the pneumatic tire 204. In this way, the pressure transmitting member 508 is able to detect or sense the pressure of the pneumatic chamber 1702 in the pneumatic tire 204. Because the sensing chamber 1150 is partially defined by the pressure transmitting member 508, the sensing chamber 1150 in turn has a pressure that tracks or corresponds to the pressure of the pneumatic chamber 1702 in the pneumatic tire 204. The pressure sensing mechanism 558 is in fluid communication with the sensing chamber 1150, so senses or detects the pressure in the sensing chamber 1150, which is in turn communicated to the PCBA 554, particularly the microcontroller 600, for transmission to other components as desired.

Turning now to FIG. 19, when, for example, the pressure of the pneumatic chamber 1702 defined by the inner tube 1700 increases (or is greater than the pressure of the pneumatic chamber 1702 in FIGS. 17 and 18), the downward force F applied by the bottom wall 1704 on the pressure transmitting member 508 (specifically the central portion 536) increases as well. In some cases, though not always, the increased pressure will cause the pressure transmitting member 508, and particularly the central portion 536, to bow inward, as is shown in FIG. 19, thereby decreasing the volume of the sensing chamber 1150. In any case, the pressure transmitting member 508 detects or senses the increased pressure. In turn, the increased pressure is sensed by the pressure sensing mechanism 558, which communicates the increased pressure to the PCBA 554.

Conversely, when the pressure of the pneumatic chamber 1702 decreases (or is less than the pressure of the pneumatic chamber 1702 in FIGS. 17 and 18), the downward force applied by the bottom wall 1704 on the pressure transmitting member 508 (specifically the central portion 536) decreases as well. In some cases, though not always, the decreased pressure will cause the pressure transmitting member 508, and particularly the central portion 536, to bow outward (not shown). In any case, the pressure transmitting member 508 detects or senses the decreased pressure. In turn, the decreased pressure is sensed by the pressure sensing mechanism 558, which communicates the decreased pressure to the PCBA 554.

As illustrated in FIGS. 20 and 21, the pressure transmitting member 508, specifically the central portion 536 of the pressure transmitting member 508, is in direct pressure communication with of the pneumatic chamber 1900 the pneumatic tire 204. The pressure of the pneumatic chamber 1900 therefore generates an outward (in this case downward) force F that is applied on the pressure transmitting member 508, with the force F corresponding to the pressure of the pneumatic chamber 1900 in the pneumatic tire 204. In this way, the pressure transmitting member 508 is able to detect or sense the pressure of the pneumatic chamber 1900 in the pneumatic tire 204. Because the sensing chamber 1150 is partially defined by the pressure transmitting member 508, the sensing chamber 1150 in turn has a pressure that tracks or corresponds to the pressure of the pneumatic chamber 1900 in the pneumatic tire 204. The pressure sensing mechanism 558 is in fluid communication with the sensing chamber 1150, so senses or detects the pressure in the sensing chamber 1150, which is in turn communicated to the PCBA 554, particularly the microcontroller 600, for transmission to other components as desired.

Turning now to FIG. 22, when, for example, the pressure of the pneumatic chamber 1900 increases (or is greater than the pressure of the chamber 1900 in FIGS. 20 and 21), the downward force F applied on the pressure transmitting member 508 (specifically the central portion 536) increases as well. In some cases, though not always, the increased pressure will cause the pressure transmitting member 508, and particularly the central portion 536, to bow inward, as is shown in FIG. 22. In any case, the pressure transmitting member 508 detects or senses the increased pressure. In turn, the increased pressure is sensed by the pressure sensing mechanism 558, which communicates the increased pressure to the PCB 554A.

Conversely, when the pressure in the pneumatic chamber 1900 decreases (or is less than the pressure of the chamber 1900 in FIGS. 20 and 21), the downward force F applied by the air in the interior 2000 on the pressure transmitting member 508 (specifically the central portion 536) decreases as well. In some cases, though not always, the decreased pressure will cause the pressure transmitting member 508, and particularly the central portion 536, to bow outward (not shown). In any case, the pressure transmitting member 508 detects or senses the decreased pressure. In turn, the decreased pressure is sensed by the pressure sensing mechanism 558, which communicates the decreased pressure to the PCB 554A.

Beneficially, while the pressure sensing mechanism 558 is able to detect or sense the pressure of the pneumatic chamber 1900 in the pneumatic tire 204 via the pressure transmitting wall 508, the pressure sensing mechanism 558 is fluidly isolated from the interior 1904 of the pneumatic tire 204. Thus, the pressure sensing mechanism 558 is fluidly isolated, and protected, from any tire sealant (e.g., Stan's, Orange, Slime, etc.) being used to seal portions of the pneumatic tire 204.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A pressure sensing assembly configured to be attached to a bicycle wheel having a tire and a rim mounted to the tire, the pressure sensing assembly comprising:
a housing defining a plane;
a pressure transmitting member coupled to the housing, the pressure transmitting member having a central portion offset from the plane in a first direction, the pressure transmitting member being an exterior surface of the pressure sensing assembly;
a sensing chamber defined by the housing and the pressure transmitting member;
an incompressible fluid disposed in the sensing chamber; and
a sensing element offset from the plane in a second direction opposite the first direction,
wherein the pressure transmitting member is configured to transmit a pressure in the tire to the sensing element via the sensing chamber,
wherein the housing includes a first housing portion and a second housing portion, the second housing portion including an aperture for receiving a power source, and the first housing portion and the second housing portion are both at least partially external surfaces of the pressure sensing assembly.

2. The pressure sensing assembly of claim 1, wherein the pressure transmitting member comprises a deflecting member.

3. The pressure sensing assembly of claim 2, wherein the deflecting member has a convex outer surface.

4. The pressure sensing assembly of claim 1, wherein the pressure transmitting member is movable responsive to pressure changes in the tire.

5. The pressure sensing assembly of claim 1, wherein the sensing element is arranged in the sensing chamber.

6. The pressure sensing assembly of claim 1, further comprising a printed circuit board disposed within the sensing chamber and a power source coupled to the printed circuit board, wherein the sensing element is disposed on the printed circuit board.

7. The pressure sensing assembly of claim 1, further comprising:
a printed circuit board disposed within the sensing chamber; and
a first wireless communicator coupled to the printed circuit board and configured to transmit data indicative of the sensed pressure of the tire.

8. The pressure sensing assembly of claim 1, further comprising a second chamber arranged adjacent the sensing chamber, the second chamber fluidly isolated from the sensing chamber, wherein the sensing element is arranged in the second chamber.

9. The pressure sensing assembly of claim 8, further comprising:
a printed circuit board disposed within the second chamber; and
a first wireless communicator coupled to the printed circuit board and configured to transmit data indicative of the sensed pressure of the tire.

10. The pressure sensing assembly of claim 8, further comprising:
a reference port formed in the housing in fluid communication with the atmosphere, wherein the reference port is formed in the second chamber.

11. The pressure sensing assembly of claim 10, further comprising:
a gas permeable and fluid impermeable barrier arranged between the sensing element and the reference port, wherein the barrier is located on a surface of the housing in the second chamber.

12. The pressure sensing assembly of claim 1, further comprising a printed circuit board and a light-emitting element coupled to the printed circuit board, the light-emitting element configured to emit light indicative of the sensed pressure of the tire.

13. The pressure sensing assembly of claim 1, further comprising:
a reference port formed in the housing and in fluid communication with atmosphere; and
a gas permeable and fluid impermeable barrier arranged between the sensing element and the reference port.

14. The pressure sensing assembly of claim 1, wherein the aperture is a circular aperture.

15. The pressure sensing assembly of claim 14, wherein the circular aperture is sized to receive the power source.

16. The pressure sensing assembly of claim 15, further comprising:
a battery door removable coupled to the second housing portion.

* * * * *